US012591673B2

(12) United States Patent
Mantin et al.

(10) Patent No.: US 12,591,673 B2
(45) Date of Patent: Mar. 31, 2026

(54) DETECTION OF CYBER ATTACKS DRIVEN BY COMPROMISED LARGE LANGUAGE MODEL APPLICATIONS

(71) Applicant: Intuit Inc., Mountain View, CA (US)

(72) Inventors: Itsik Yizhak Mantin, Hod HaSharon (IL); Ron Bitton, Or-Yehuda (IL)

(73) Assignee: Intuit Inc., Mountain View, CA (US)

( * ) Notice: Subject to any disclaimer, the term of this patent is extended or adjusted under 35 U.S.C. 154(b) by 134 days.

(21) Appl. No.: 18/478,939

(22) Filed: Sep. 29, 2023

(65) Prior Publication Data

US 2025/0111051 A1 Apr. 3, 2025

(51) Int. Cl.
*G06F 21/56* (2013.01)
*G06F 21/54* (2013.01)
*G06F 21/55* (2013.01)

(52) U.S. Cl.
CPC ............ *G06F 21/566* (2013.01); *G06F 21/54* (2013.01); *G06F 21/554* (2013.01)

(58) Field of Classification Search
CPC ............................... G06F 21/566; G06F 21/54
See application file for complete search history.

(56) References Cited

U.S. PATENT DOCUMENTS

| | | | | |
|---|---|---|---|---|
| 11,481,488 | B2 * | 10/2022 | Chiben | ............... G06F 11/3604 |
| 11,620,379 | B1 * | 4/2023 | Hegde | ................... G06F 21/554 |
| | | | | 706/23 |
| 11,637,866 | B2 * | 4/2023 | Crabtree | ............. H04L 63/1433 |
| | | | | 726/22 |
| 11,914,724 | B2 * | 2/2024 | Grebennikov | ........ G06F 21/602 |
| 12,450,348 | B2 * | 10/2025 | Kim | ........................ G06F 21/563 |
| 2021/0056211 | A1 * | 2/2021 | Olson | ....................... G06N 5/01 |
| 2023/0281308 | A1 * | 9/2023 | Maimon | ............... G06F 21/563 |
| | | | | 726/25 |
| 2024/0015174 | A1 * | 1/2024 | Copty | ................. H04L 63/1416 |
| 2024/0386103 | A1 * | 11/2024 | Clement | ................. G06F 21/56 |
| 2024/0411994 | A1 * | 12/2024 | Siracusano | ........... G06F 40/205 |
| 2024/0427587 | A1 * | 12/2024 | Tyborowski | .............. G06F 8/65 |
| 2024/0427879 | A1 * | 12/2024 | Bulut | .................... G06F 21/554 |
| 2025/0030704 | A1 * | 1/2025 | Kim | .................... H04L 63/1416 |
| 2025/0039235 | A1 * | 1/2025 | Hanes | ............... H04L 63/1416 |
| 2025/0045411 | A1 * | 2/2025 | Singh | .................... G06F 21/552 |
| 2025/0045531 | A1 * | 2/2025 | Hayes | ..................... G06F 40/56 |
| 2025/0068741 | A1 * | 2/2025 | Lafon | ................... G06F 21/577 |

(Continued)

*Primary Examiner* — Viral S Lakhia
(74) *Attorney, Agent, or Firm* — Lathrop GPM LLP

(57) ABSTRACT

A method including receiving, at a large language model, a prompt injection cyberattack. The method also includes executing the large language model. The large language model takes, as input, the prompt injection cyberattack and generates a first output. The method also includes receiving, by a guardian controller, the first output of the large language model. The guardian controller includes a machine learning model and a security application. The method also includes determining a probability that the first output of the large language model is poisoned by the prompt injection cyberattack. The method also includes determining whether the probability satisfies a threshold. The method also includes enforcing, by the guardian controller and responsive to the probability satisfying the threshold, a security scheme on use of the first output of the large language model by a control application. Enforcing the security scheme mitigates the prompt injection cyberattack.

16 Claims, 16 Drawing Sheets

(56)     References Cited

U.S. PATENT DOCUMENTS

| 2025/0077681 A1* | 3/2025 | Sen | G06F 8/61 |
| 2025/0103715 A1* | 3/2025 | Jackson | G06F 21/566 |
| 2025/0112874 A1* | 4/2025 | Schneider | H04L 47/801 |

* cited by examiner

1000

DETECTION OF CYBER ATTACKS DRIVEN BY COMPROMISED LARGE LANGUAGE MODEL APPLICATIONS

BACKGROUND

A large language model is a deep learning algorithm that can perform a variety of natural language processing tasks. A large language model uses transformer models that are trained using massive datasets. Training a large language model on massive data sets enables the large language model to recognize, translate, predict, or generate text or other content. A large language model has applications in a wide variety of text applications, including generation of text content, summarization of text content, generation of computer code, and other uses.

A large language model may be subject to a type of cyberattack known as a prompt injection cyberattack. A prompt injection cyberattack is a type of cyberattack where a malicious user surreptitiously enters a text prompt into a large language model when a legitimate user requests the large language model to perform a legitimate function. Thus, the output of the large language model may be under the control of the malicious user, rather than of the legitimate user.

A prompt injection cyberattack may cause the large language model to generate outputs that are undesirable to the legitimate user. For example, the large language model may ignore previous instructions and content moderation guidelines. In other examples, the large language model may expose underlying data, or manipulate the output to produce content that would typically be forbidden by the legitimate user. In a specific example, the large language model could generate spam (undesirable emails or other electronic messages) or phishing messages (messages having content designed to trick recipients into revealing sensitive information). Malicious users also may use prompt injection cyberattacks to generate discriminatory, offensive, or misinformation content, or to cause the large language model to generate malicious code or malware.

There are two main types of prompt injection cyberattacks: direct and indirect. In a direct attack, a malicious user modifies a large language model's input in an attempt to overwrite existing system prompts. In an indirect attack, a malicious user may poison the large language model's data source, such as a website, to manipulate the data input. For example, a malicious user could enter a malicious prompt on a website, and the large language model would then scan and respond to the malicious prompt.

SUMMARY

The one or more embodiments include a method. The method includes receiving, at a large language model, a prompt injection cyberattack. The method also includes executing the large language model. The large language model takes, as input, the prompt injection cyberattack and generates a first output. The method also includes receiving, by a guardian controller, the first output of the large language model. The guardian controller includes a machine learning model and a security application. The method also includes determining a probability that the first output of the large language model is poisoned by the prompt injection cyberattack. The method also includes determining whether the probability satisfies a threshold. The method also includes enforcing, by the guardian controller and responsive to the probability satisfying the threshold, a security scheme on use of the first output of the large language model by a control application. Enforcing the security scheme mitigates the prompt injection cyberattack.

The one or more embodiments also provide for a system. The system includes a processor and a data repository in communication with the processor. The system also includes a large language model which, when executed by the processor, generates a first output from a first input including at least a prompt injection cyberattack. The system also includes a control application which, when executed by the processor, is programmed to coordinate the first input and the first output of the large language model. The system also includes a controlled application which, when executed by the processor, is programmed to receive, as a second input, the first output from the large language model and to generate a second output using the first output from the large language model. The system also includes a guardian controller which, when executed by the processor, is programmed to monitor the first output of the large language model. The guardian controller is also programmed to determine a probability that the first output of the large language model is poisoned by the prompt injection cyberattack. The guardian controller is also programmed to determine whether the probability satisfies a threshold. The guardian controller is also programmed to enforce, responsive to the probability satisfying the threshold, a security scheme on use of the first output of the large language model by the control application. Enforcing the security scheme mitigates the prompt injection cyberattack.

The one or more embodiments also provide for a method of training a machine learning model. The method includes generating, by a control application, queries to a large language model. At least some of the queries include known prompt injection cyberattacks. The method also includes generating first outputs of the large language model by executing the large language model on at least a subset of the queries. The method also includes training, iteratively, the machine learning model using the first outputs and a second subset of the queries until convergence to generate a trained machine learning model which, when executed, is trained to detect prompt injection cyberattacks in a monitored outputs of the large language model.

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
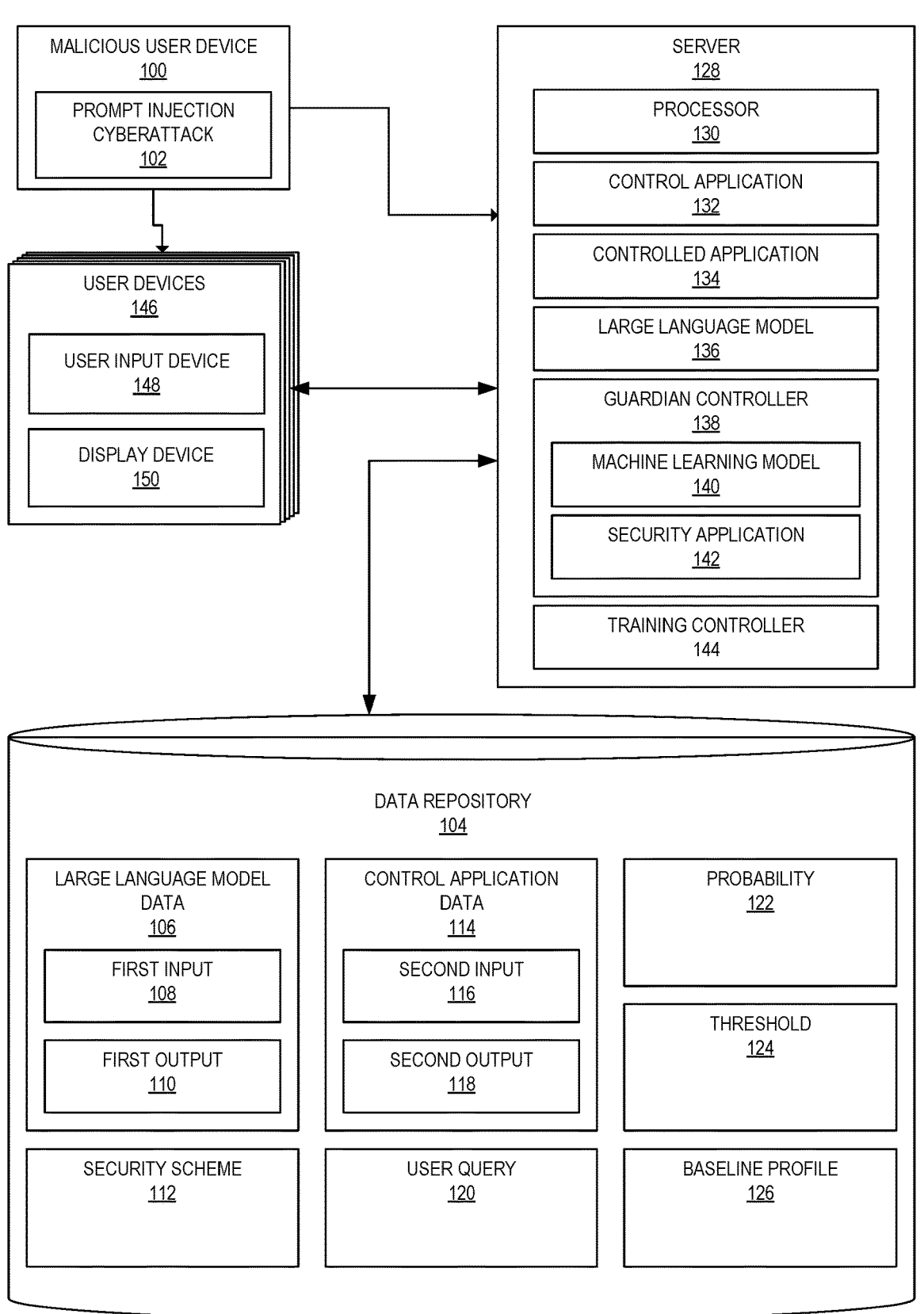
FIG. 1A and FIG. 1B show a computing system, in accordance with one or more embodiments.

In general, embodiments are directed to methods and system for defending against prompt injection cyberattacks. In particular, the one or more embodiments may be oriented towards preventing the output of a poisoned large language model from adversely affecting the operations of a control application that uses the output of the large language model to perform some other function.

As defined more fully below, a control application is software or application specific hardware that interacts with a large language model in order to accomplish some desired function. For example, a user may interact with a control application to generate emails. The control application may interact with a large language model to generate the text of the emails. Either the large language model itself or the control application may interact with one or more email programs to generate the emails themselves (e.g., to fill in recipient email addresses in "to" boxes, etc.). The user then may send the emails or command the control application or the large language model to send the emails automatically.

One means for performing a cyberattack on the control application is to perform a prompt injection cyberattack on the large language model. Because the output of the large language model may be poisoned by the prompt injection cyberattack, the output of the control application likewise may be poisoned. Examples of this type of prompt injection cyberattack are described with respect to FIG. 4A and FIG. 4B. The one or more embodiments may be used to mitigate, or possibly defeat, the prompt injection cyberattack on the control application, the large language model, or both.

The one or more embodiments provide for a guardian controller that may be provided with a system that includes the control application, the large language model, and a controlled application (e.g., the email program in the example above). The guardian controller includes a machine learning model that monitors the output of the machine learning model. The output of the machine learning model is one or more probabilities that reflect an assessed likelihood that the output of the large language model is influenced by a prompt injection cyberattack. If the one or more probabilities satisfy a threshold, then a determination is made that the output of the large language model is influenced (i.e., poisoned) by the prompt injection cyberattack.

The guardian controller also may include a security application. The security application is software or application specific hardware that performs a cyber action if the one or more probabilities satisfy the threshold. The cyber actions may include a number of different commands that mitigate or eliminate the threat posed by the poisoned output of the large language model. Examples of the actions are described further below, but may include, for example, blocking the output of the large language model, limiting the use of the output of the large language model by the control application, or some other action. In this manner, the effect of the prompt injection cyberattack may be mitigated or stopped altogether.

Attention is now turned to the figures. FIG. 1A shows a computing system, in accordance with one or more embodiments. The malicious user device (100) is a computing device that is the source of a prompt injection cyberattack (102). The system shown in FIG. 1A shows a malicious user device (100), though in many cases the malicious user device (100) is external to the system shown in FIG. 1A. However, in some cases, a local user device may become controlled by a malicious user or otherwise be the gateway through with the malicious user device (100) may act; thus, it is possible that the malicious user device (100) is, knowingly or unknowingly, part of the system shown in FIG. 1A.

The prompt injection cyberattack (102) may be used to attack one or more controllers or applications executing on a server (128), defined below, or may be used to attack one or more of the user device (146), defined below. As used herein the terms "cyberattack" or "attack" means to modify, to subvert, or to control the output of one or more applications or controllers usable by a legitimate user for legitimate purposes. Thus, a "cyberattack" or "attack" is performed without the permission of the legitimate user. The legitimate user may, or may not, be aware of the cyberattack.

The prompt injection cyberattack (102) may be said to poison the first output (110) to the large language model (136). Stated differently, the first output (110) may be poisoned by the prompt injection cyberattack (102). The terms "poison" or "poisoned," as used herein, means that the first output (110) is influenced in some manner by the prompt injection cyberattack (102), as described above.

The system shown in FIG. 1A includes a data repository (104). The data repository (104) is a type of storage unit and/or device (e.g., a file system, database, data structure, or any other storage mechanism) for storing data. The data repository (104) may include multiple different, potentially heterogeneous, storage units and/or devices.

The data repository (104) stores large language model data (106). The large language model data (106) is data input to or output from a large language model, such as the large language model (136) defined further below. Thus, the large language model data (106) includes a first input (108) and a first output (110). The large language model data (106) may be text data. Thus, the first input (108) is text input and the first output (110) is text output. However, the term "text" may include alphanumeric characters as well as special characters (e.g., "*", "@", etc.).

In an embodiment the prompt injection cyberattack (102) may be the first output (110). Thus, for example, the malicious user may use the malicious user device (100) to insert the prompt injection cyberattack (102) via the first output (110) to the large language model data (106).

Insertion of the prompt injection cyberattack (102) may take a variety of different forms. The malicious user device (100) may, for example, intercept the first output (110) provided by the legitimate user to the control application (132). The malicious user device (100) may take over direct control of the first output (110) to the large language model (136), thereby preventing the legitimate user from providing the first output (110). The prompt injection cyberattack (102) may be delivered by other means as well, though the net result is that the legitimate input provided by the legitimate user may be coopted or poisoned by the malicious user device (100), thereby implementing the prompt injection cyberattack (102).

As used herein, the term "first," when used with respect to the first input (108) or the first output (110), is used to identify that the respective input or output is to or from the large language model (136). The term "first," in this context, does not necessarily refer to the order in which data flows in the one or more embodiments.

The data repository (104) also stores a security scheme (112). The security scheme (112) is one or more predetermined computer executed actions that occur when the guardian controller (138) (defined below) determines that a prompt injection cyberattack is likely (as described with respect to the method of FIG. 2). The security scheme (112) also may include one or more applications or interfaces that execute when the guardian controller (138) determines that the prompt injection cyberattack is likely. The security scheme (112), when executed, may enforce the computer executed actions on use of the first output of the large language model by the control application, thereby mitigating the prompt injection cyberattack. Implementation of the security scheme (112) is described with respect to FIG. 2.

The data repository (104) also may store control application data (114). The control application data (114) is data input to, used by, or output by the control application (132) (defined further below). Thus, the control application data (114) includes a second input (116) and a second output (118). The control application data (114) may be text data or other computer useable data. Thus, in addition to the second input (116) being text input and the second output (118) being text output, the second input (116) and the second output (118) may be other types of data useable by the control application (132). As an example, the control application data (114) may include data that is used to collate text received as the first output (110) of the large language model data (106) together with other information or instructions that the control application (132) uses to generate the second output (118).

As used herein, the term "second," when used with respect to the second input (116) or the second output (118), is used to identify that the respective input or output is to or from the controlled application (134). The term "second," in this context, does not necessarily refer to the order in which data flows in the one or more embodiments.

The data repository (104) also may store a user query (120). The user query (120) is a query received from one of the user devices (146). In embodiment, the user query (120) may be received from the malicious user device (100), in which case the user query (120) may be referred to as a malicious query. The user query (120) may be received at the server (128) or may be received directly by one of the control application (132) or the large language model (136). In many cases, the control application (132) receives the user query (120), as the purpose of the control application (132) is to coordinate execution of the large language model (136) and the controlled application (134), as described below with respect to FIG. 2.

The data repository (104) also may store a probability (122). The probability (122), as used herein, refers to one or more probabilities. Nevertheless, the probability (122) is one or more values output by the machine learning model (140) of the guardian controller (138), both defined further below. The probability (122) represents a likelihood that the first output (110) of the large language model (136) is poisoned by the prompt injection cyberattack (102).

The data repository (104) also may store a threshold (124). The threshold (124) is a value that represents a point at which the probability (122) is considered high enough that the first output (110) of the large language model (136) will be treated as having been poisoned by the prompt injection cyberattack (102). Thus, the probability (122) may be compared to the threshold (124), and if the threshold (124) is satisfied by the probability (122), then the first output (110) of the large language model (136) is treated as being poisoned by the prompt injection cyberattack (102).

The term "satisfied" means that a pre-condition is met when the probability (122) is compared to the threshold (124). The pre-condition may be the probability (122) being equal to or greater than the threshold (124) or may be the probability (122) being greater than the threshold (124).

The data repository (104) also stores a baseline profile (126). The baseline profile (126) is a set of operating parameters of the control application (132) when it is known that the first output (110) of the large language model (136) is not poisoned by the prompt injection cyberattack (102). Thus, for example, when the probability (122) satisfies the threshold (124), the baseline profile (126) may be enforced as part of the security scheme (112).

The baseline profile (126) may take many forms, depending on the nature of at least one of the control application (132) and the controlled application (134). For example, the baseline profile (126) may be an average number of emails sent per day by the control application (132). In this case, the baseline profile (126) may be used to limit the number of emails being sent out by the control application (132) to be equal to or less than the number of emails specified in the baseline profile (126). In another example, the baseline profile (126) may be a list of email addresses. While the baseline profile (126) may change over time, once the probability (122) satisfies the threshold (124), the baseline profile (126) is locked and only the recipients present in the list prior to the probability (122) satisfying the threshold (124) may be accessed by the control application (132). In still another example, the baseline profile (126) may be a list of uniform resource links (URLs) of one or more of the controlled applications. While the list of URLs may change over time, once the probability (122) satisfies the threshold (124), then the baseline profile (126) is locked and only those URLs in the baseline profile (126) prior to the probability (122) satisfying the threshold (124) may be accessed by the control application (132).

The baseline profile (126) may take on still other forms. Thus, the baseline profile (126) is not necessarily limited to the examples provided above.

The system shown in FIG. 1A may include other components. For example, the system shown in FIG. 1A also may include a server (128). The server (128) is one or more computing devices in a possibly distributed computing environment. An example of the server (128) may be found in FIG. 1A0A.

The server (128) may include a processor (130). The processor (130) is hardware (e.g., a processor chip and possibly associated hardware) or software (e.g. a virtual processor) that is capable of executing a computer executed action. An example of the processor (130) is the computer processor(s) (1002) of FIG. 10A.

The server (128) may include a control application (132). The control application (132) is software or application specific hardware that is programmed to coordinate the inputs and outputs of at least one of the large language model (136) and the controlled application (134). The control application (132) may aid a user to accomplish a function that uses the inputs and outputs of the large language model (136) working in conjunction with the controlled application (134). The control application (132) may have other functions. Examples of the control application (132) are described with respect to FIG. 4A through FIG. 9B.

The server (128) also may include a controlled application (134). The controlled application (134) is software or application specific hardware which, when executed by the processor (130), executes a desired function. Examples of the controlled application (134) are provided with respect to FIG. 4A through FIG. 9B.

Specific examples of the controlled application (134) may include an email application executable by the processor (130). Other examples of the controlled application (134) may include a connection to an external network, a second data repository readable by the processor, a code generation application executable by the processor, and a network content regulation application executable by the processor. Still other examples of the controlled application (134) are contemplated. Thus, the examples of the controlled application (134) provided above do not necessarily limit the scope of the appended claims.

In any case, the controlled application (134) is programmed to receive, as the second input (116), the first output (110) from the large language model (136) and to generate the second output (118) using the first output (110) from the large language model (136). Again, examples of this procedure are provided in FIG. 2 as well as in FIG. 4A through FIG. 9B.

The server (128) may include a large language model (136). As provided above, the large language model (136) is a deep learning algorithm that can perform a variety of natural language processing tasks. The large language model (136) may use transformer models that are trained using massive datasets. Training the large language model (136) on massive data sets may enable the large language model to recognize, translate, predict, or generate text or other content. However, the large language model (136) may not have the functionality to perform other desired functions, such as but not limited to generating and sending emails.

The server (128) also includes a guardian controller (138). The guardian controller (138) is one or more sets of software or application specific hardware that, when executed by the processor (130), performs the method of FIG. 2. The guardian controller (138) includes at least a machine learning model (140).

As an example, the guardian controller (138) may be programmed to monitor the first output (110) of the large language model (136). The guardian controller (138) may be programmed to determine the probability (122) that the first output (110) of the large language model (136) is poisoned by the prompt injection cyberattack (102). The guardian controller (138) may be programmed to determine whether the probability (122) satisfies the threshold (124). The guardian controller (138) may be programmed to enforce, responsive to the probability satisfying the threshold (124), the security scheme (112) on use of the first output (110) of the large language model (136) by the control application (132). Thus, the guardian controller (138) may, by enforcing the security scheme (112), mitigate the prompt injection cyberattack (102).

The machine learning model (140) of the guardian controller (138) may be a classification machine learning model, which may be either a supervised or an unsupervised machine learning model. The machine learning model (140) is trained to determine the probability (122) that the first output (110) of the large language model data (106) is poisoned by the prompt injection cyberattack (102).

The guardian controller (138) may include a security application (142). However, the security application (142) may be external to the guardian controller (138) (i.e. in some other location in the data flow path between the control application (132), the controlled application (134), and the large language model (136)). Thus, the security application (142) is not necessarily part of the guardian controller (138). Additional details are provided with respect to the method of FIG. 2.

Nevertheless, the security application (142) is software or application specific hardware which, when executed by the processor (130), enforces the security scheme (112). Because the nature of the security scheme (112) may vary, the programming of the security application (142) may vary accordingly. Additional details are provided with respect to the method of FIG. 2.

The server (128) also may include a training controller (144). The training controller (144) is software or application specific hardware which, when executed by the processor (130), trains one or both of the large language model (136) or the machine learning model (140). In an embodiment, the large language model (136) is trained by a third party, and the training controller (144) is used to train the machine learning model (140). However, the training controller (144) could also be used to train the large language model (136). Details regarding the operation of the training controller (144) are described with respect to FIG. 1AB.

The system shown in FIG. 1A may include one or more of user devices (146). The user devices (146) may be external to the system of FIG. 1A, and thus are not necessarily part of the system of FIG. 1A. The user devices (146) are desktop computers, laptop computers, tablets, smartphones, or other computing devices that may be used to access the server (128). The user devices (146) may provide one or more of user input devices, such as the user input device (148), and one or more display devices, such as the display device (150). The user input device (148) may be mice, keyboards, touchscreens, microphones, etc. The display device (150) may include monitors, televisions, touchscreens, haptic devices, speakers, etc.

The user input devices and the display devices may be used to control the control application (132). In this manner, the users may quickly and easily leverage the power of the control application (132) to combine the operations of the large language model (136) and the controlled application (134) to generate a result (e.g., generate emails, email recipients, and the text or images contained by the emails).

While FIG. 1A shows a configuration of components, other configurations may be used without departing from the scope of the one or more embodiments. For example, various components may be combined to create a single component. As another example, the functionality performed by a single component may be performed by two or more components.

Figure 1B:
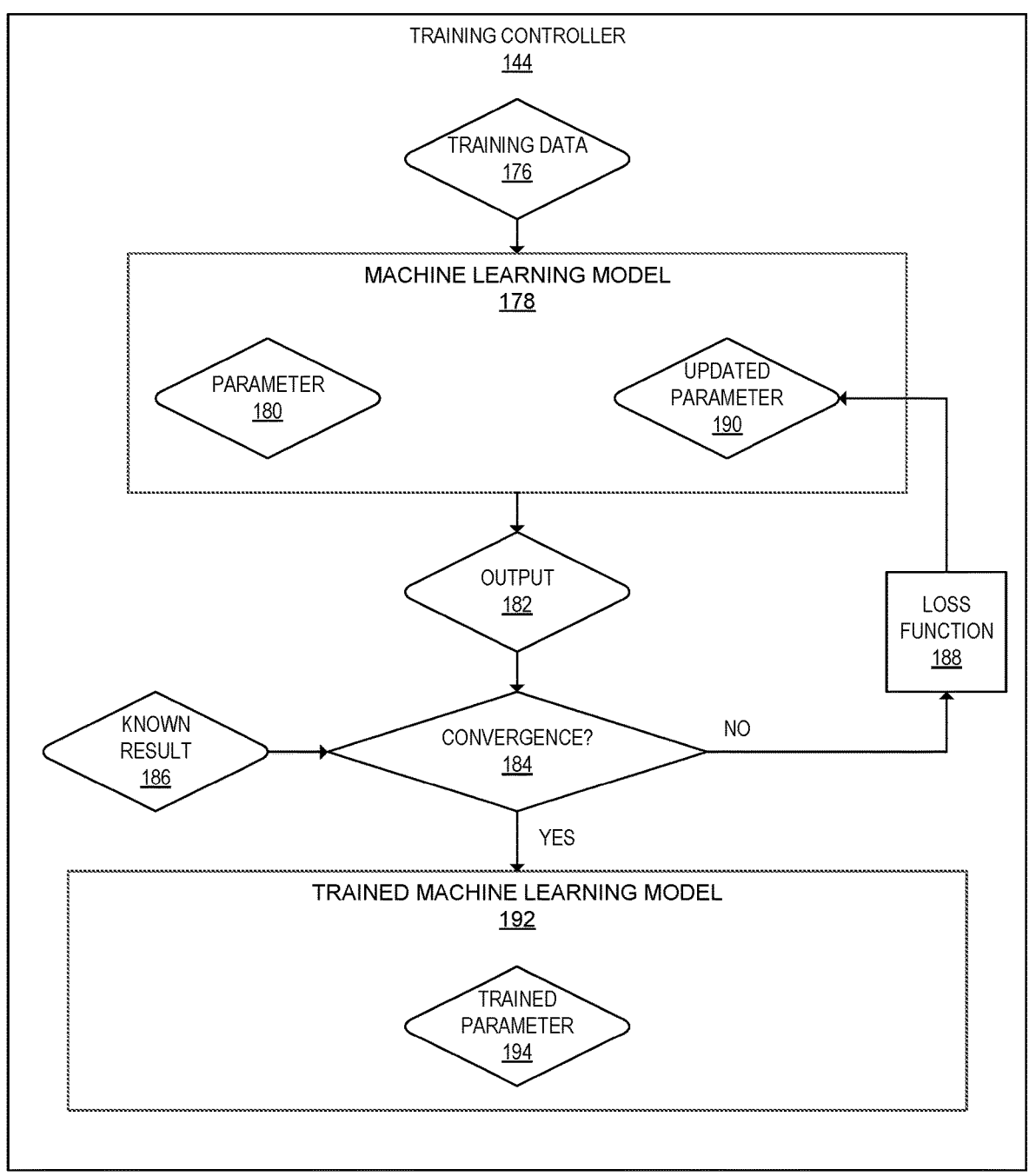

Attention is turned to FIG. 1B, which shows the details of the training controller (144). The training controller (144) is, in particular, a training algorithm, implemented as software or application specific hardware, which may be used to train one or more the machine learning models described with respect to FIG. 1A, including the machine learning model (140) and possibly including the large language model (136). The training controller (144) may be used to train other machine learning models.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (192)) is applied to unknown data in order to make predictions.

Referring to FIG. 1A, "unknown data" is data for which it is not known whether the prompt injection cyberattack (102) has affected the large language model (136). Thus, the unknown data may be the first output (110) of the large language model (136) or may be output returned by the controlled application (134) after the large language model (136) has influenced the output of the controlled application (134).

In more detail, training starts with training data (176). The training data (176) is data for which the final result is known with certainty. For example, the training data (176) may include sample outputs. Referring to FIG. 1A, the sample outputs may include the first output (110) or the output of the controlled application (134) returned to the control application (132). It is known which of the sample outputs were influenced by the prompt injection cyberattack (102) and which were not influenced by the prompt injection cyberattack (102).

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) compares the output (182) to a known result (186). A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program which adjusts the parameter (180) in order to generate an updated parameter (190). The basis for performing the adjustment is defined by the program that makes up the loss function (188), but may be a scheme which attempts to guess how the parameter (180) may be changed so that the next execution of the machine learning model (178) using the training data (176) with the updated parameter (190) will have an output (182) that more closely matches the known result (186).

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194).

During deployment, the trained machine learning model (192) with the trained parameter (194) is executed again, but this time on the unknown data for which the final result is not known. The output of the trained machine learning model (192) is then treated as a prediction of the information of interest relative to the unknown data (i.e., the output of the trained machine learning model (192) may be the probability (122) in the example of FIG. 1A).

Figures 2, 3:
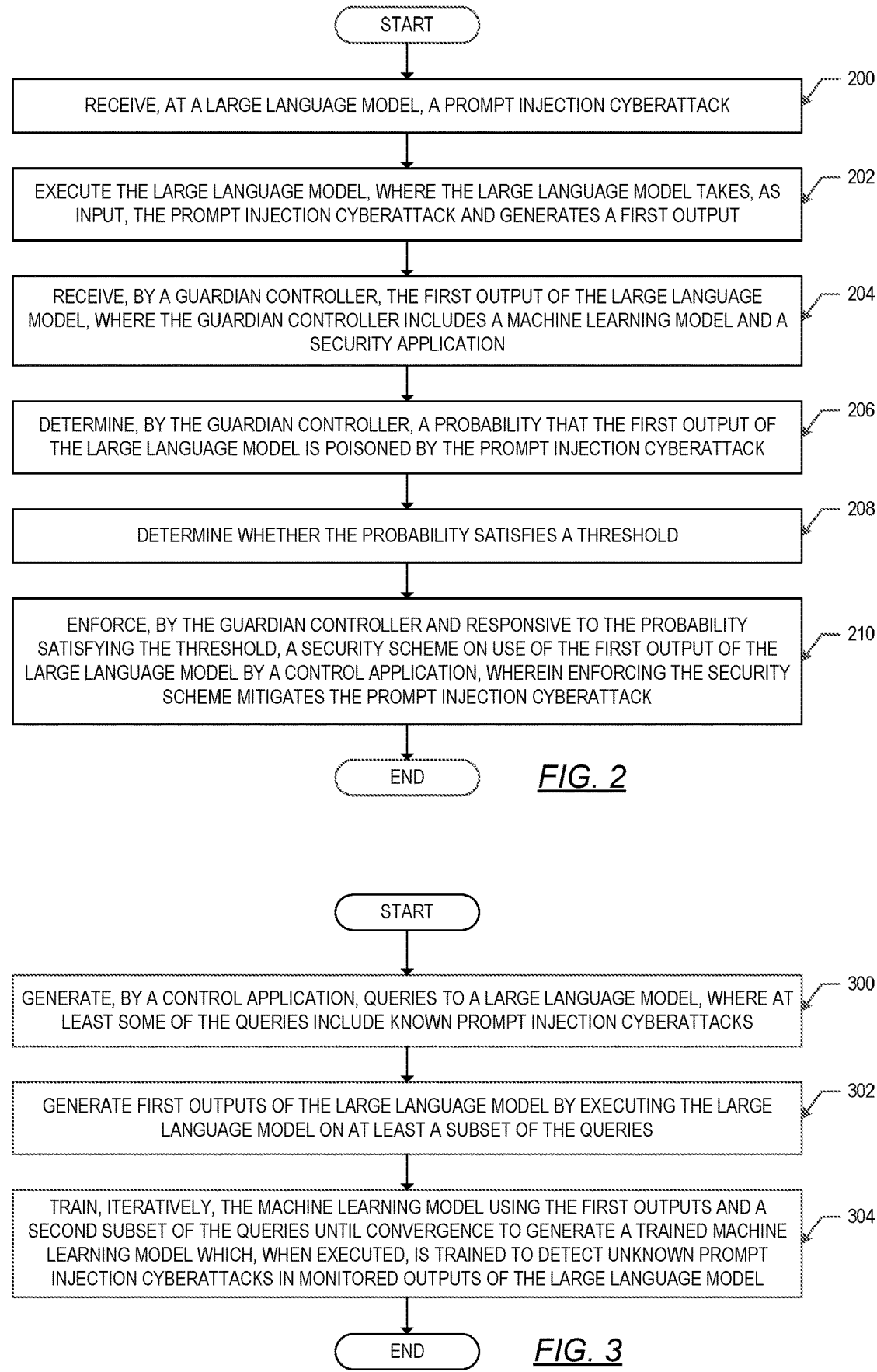
FIG. 2 and FIG. 3 show flowcharts of methods, in accordance with one or more embodiments.

Attention is now turned to FIG. 2. FIG. 2 is a method of mitigating the prompt injection cyberattack (102) described with respect to FIG. 1A. The method of FIG. 2 thus may be executed using the system shown in FIG. 1A, possibly in conjunction with the computing system and network environment described with respect to FIG. 10A and FIG. 10B.

Step 200 includes receiving, at a large language model, a prompt injection cyberattack. The prompt injection cyberattack may be received from a malicious user device. In particular, the prompt injection cyberattack may be received by the malicious user device taking control of the input to the large language model. The prompt injection cyberattack also may be received in the form of the malicious user device reaching through the user device to deliver the prompt injection cyberattack to the control application via the user device. The prompt injection cyberattack also may be received by the malicious user device intercepting the output of the control application to the large language model. The prompt injection cyberattack may be received via other attack paths; thus, the examples given above do not necessarily limit how the prompt injection cyberattack (102) (FIG. 1A) is received.

Step 202 includes executing the large language model, where the large language model takes, as input, the prompt injection cyberattack and generates a first output. The execution of the large language model may proceed according to the programming of the large language model. However, because the prompt provided to the large language model has been poisoned by the prompt injection cyberattack, the large language model may be considered as having taken as input the prompt injection cyberattack.

Thus, for example, the poisoned input to the large language model may be the prompt injection cyberattack itself. However, the poisoned input to the large language model also may be a modified version of the original input provided by the control application, the user, or even the controlled application (if the controlled application provides an input to the large language model). Thus, the exact nature of the poisoned input provided to the large language model may vary, but the large language model is still executed using the poisoned input.

Step 204 includes receiving, by a guardian controller, the first output of the large language model, where the guardian controller includes a machine learning model and a security application. The first output of the large language model may be received directly or indirectly, and thus may not be only the direct output of the large language model. However, the first output of the large language model may be received directly from the large language model.

As an example of an indirect receipt of the first output of the large language model, the large language model may access the functions of the controlled application. More specifically, the large language model could transmit the poisoned output of the large language model to the controlled application. The controlled application could then execute on the poisoned output of the large language model, and then the controlled application returns the influenced output of the controlled application to the control application. In another example, the large language model could control the controlled application directly, receive the output of the controlled application, and then the large language model returns the final output to the control application.

Other indirect means of the large language model returning an output to the control application are possible. Nevertheless, as used herein, reference to receiving the first output of the large language model may be considered receiving any kind of output from the controlled application or some other application, so long as the output of the controlled application or the other application has been influenced by the effect of the prompt injection cyberattack on the output of the large language model.

Additionally, it is noted that the poisoned output of the large language model, whether direct or indirect, is received by the guardian controller. Thus, the guardian controller is placed in a data flow path before the poisoned output (whether directly or indirectly from the large language model) reaches the control application. As an alternative, the guardian controller may be part of the control application itself, in which case receiving the first output of the large language model may be performed by the control application itself.

Step 206 includes determining, by the guardian controller, a probability that the first output of the large language model is poisoned by the prompt injection cyberattack. The probability may be determined by executing a machine learning model on the output being returned by the large language model (i.e., the input of the machine learning model is the output of the large language model). Again, the output returned by the machine learning model may be direct or indirect, as explained above with respect to step 204. However, the output of the machine learning model is the probability that is generated.

In another embodiment, the probability may be generated using non-machine learning rules or policies. For example, if the controlled application is an email generator, and if the number of returned emails exceeds a second threshold, then the threshold probability of a prompt injection cyberattack being present also may be satisfied. Thus, the machine learning model of the guardian controller may be replaced by rules or policies that determine the probability.

Step 208 includes determining whether the probability satisfies a threshold. Satisfaction of the threshold is based on a predetermined condition that occurs when the probability is compared to the threshold. For example, the predetermined condition may be that the probability meets or exceeds the threshold. The predetermined condition may be that the probability exceeds the threshold. The predetermined condition may be that the probability with within a selected range of values, in which case the threshold is the selected range of values. Other predetermined conditions may exist.

Step 210 includes enforcing, by the guardian controller and responsive to the probability satisfying the threshold, a security scheme on use of the first output of the large language model by a control application, where enforcing the security scheme mitigates the prompt injection cyberattack. As indicated above with respect to FIG. 1A, the security scheme may take many different formats. Thus, exact procedure of enforcing the security scheme depends on the nature of the security scheme. Nevertheless, several examples are provided below, and additional examples are provided with respect to FIG. 4A through FIG. 9B.

The security scheme may include executing a computer executed action to limit the use of the first output of the large language model by the control application (defined below). The computer executed action may be to prevent the control application from receiving the first output of the large language model.

The computer executed action of the security scheme may be to modify the first output of the machine learning model to comply with an enforcement profile. The enforcement profile may be, for example, a hard-coded list of actions or recipients that the control application is permitted to perform or transmit. The enforcement profile may be a list of actions or recipients that the control application is not permitted to perform or transmit. The enforcement profile may take other forms.

The computer executed action of the security scheme may be to require user authentication to execute the control application. Thus, a user may validate whether or not the control application will perform an action. The user may also take other actions upon being notified of a likely prompt injection cyberattack.

The computer executed action of the security scheme may be a step related to the controlled application (defined below). For example, the step may be for the guardian controller to permit transmission of an email, or block transmission of the email. In this case, the controlled application is an email generation program. The computer executed action of the control application may be to transmit the email generated by the controlled application.

Figure 6A:
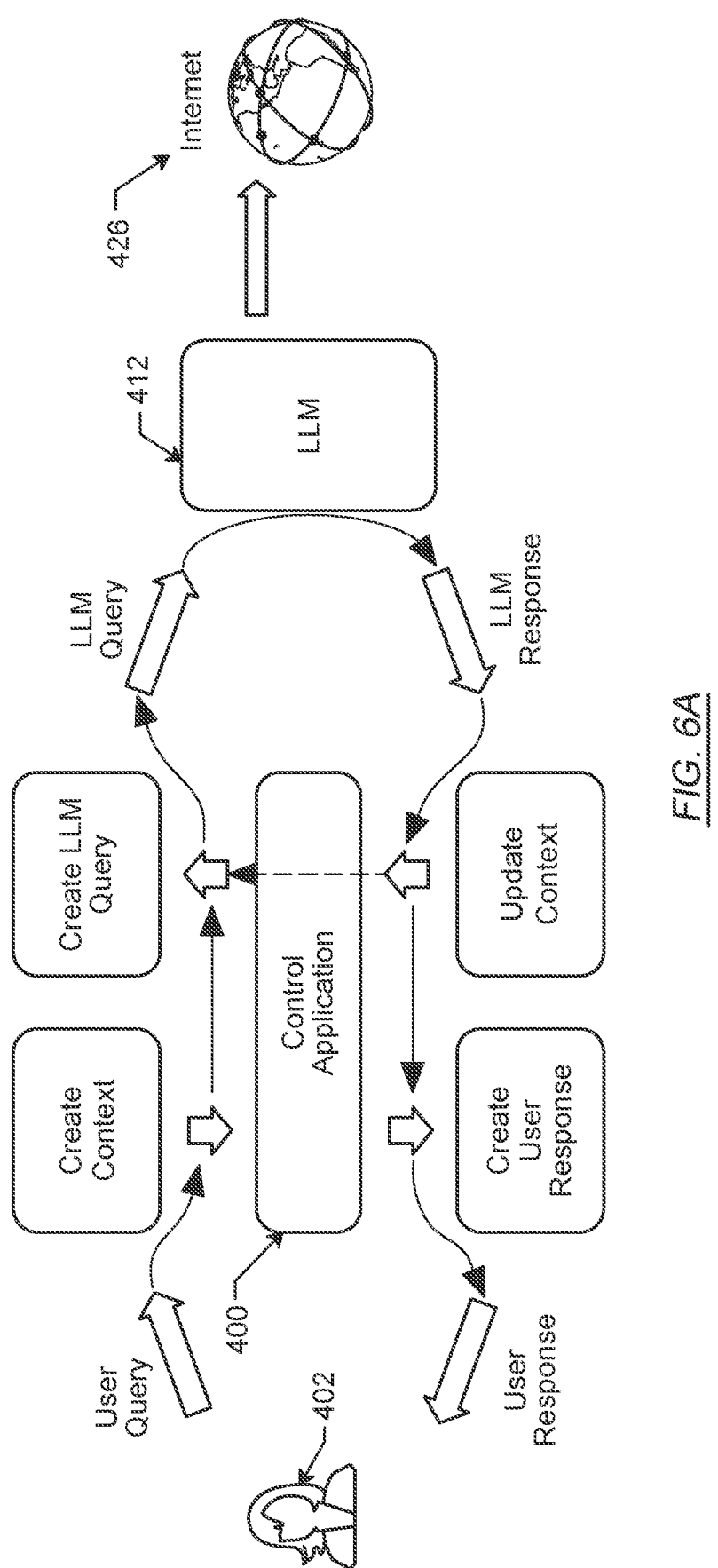
Figure 6B:
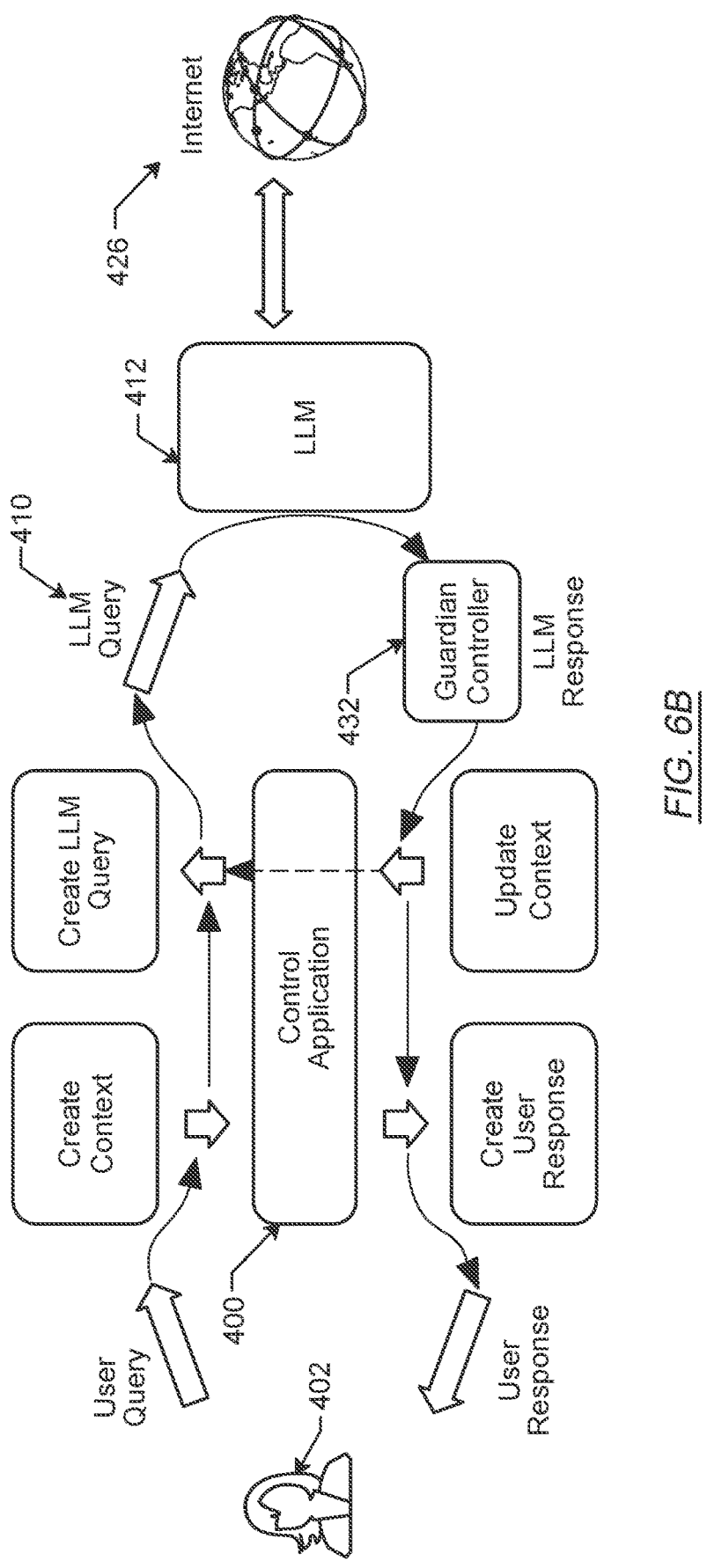

The step may be to grant or deny the control application access to a network. In this case, the network may be the controlled application. An example is shown in FIG. 6A and FIG. 6B.

Figure 7A:
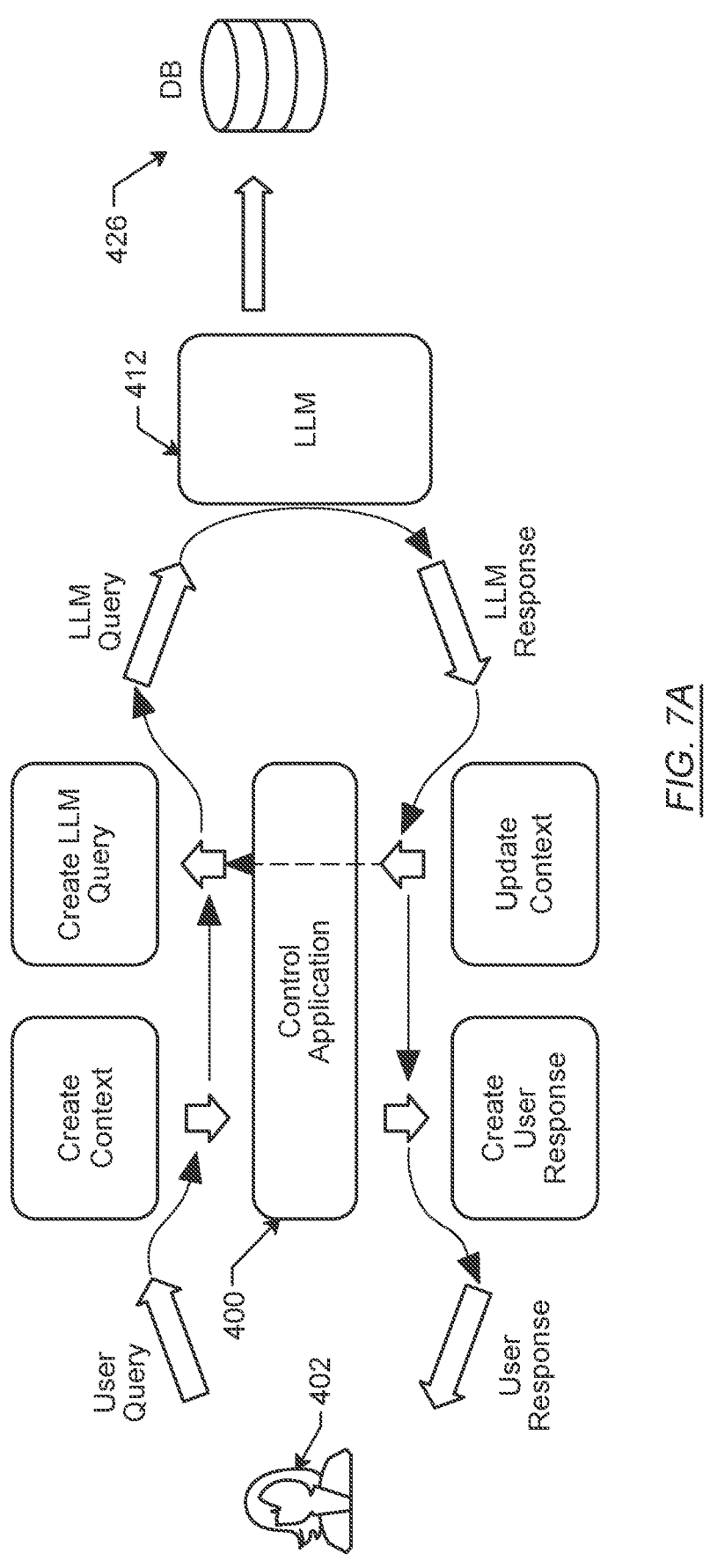
Figure 7B:
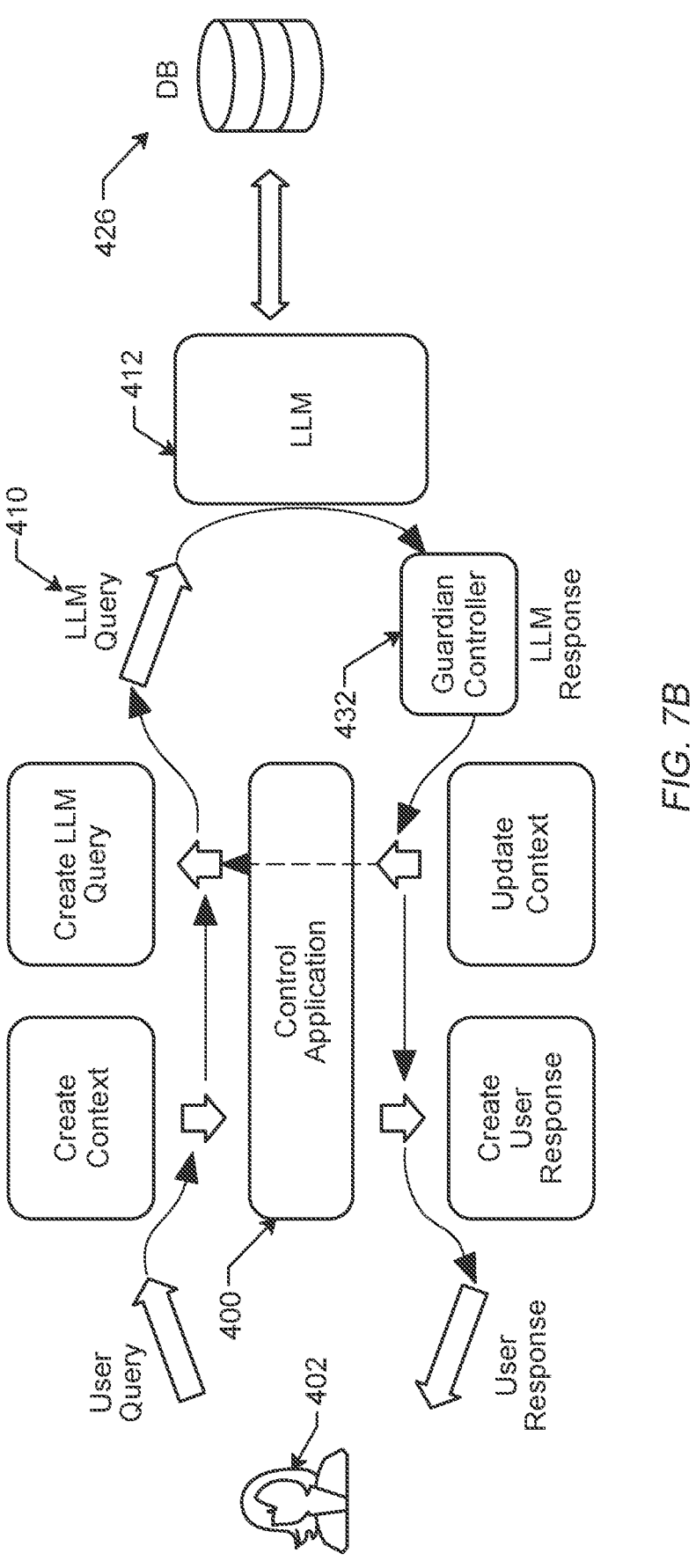

The step may be to grant or deny the control application access to a database. In this case, the database may be the controlled application. An example is shown in FIG. 7A and FIG. 7B.

Figure 8A:
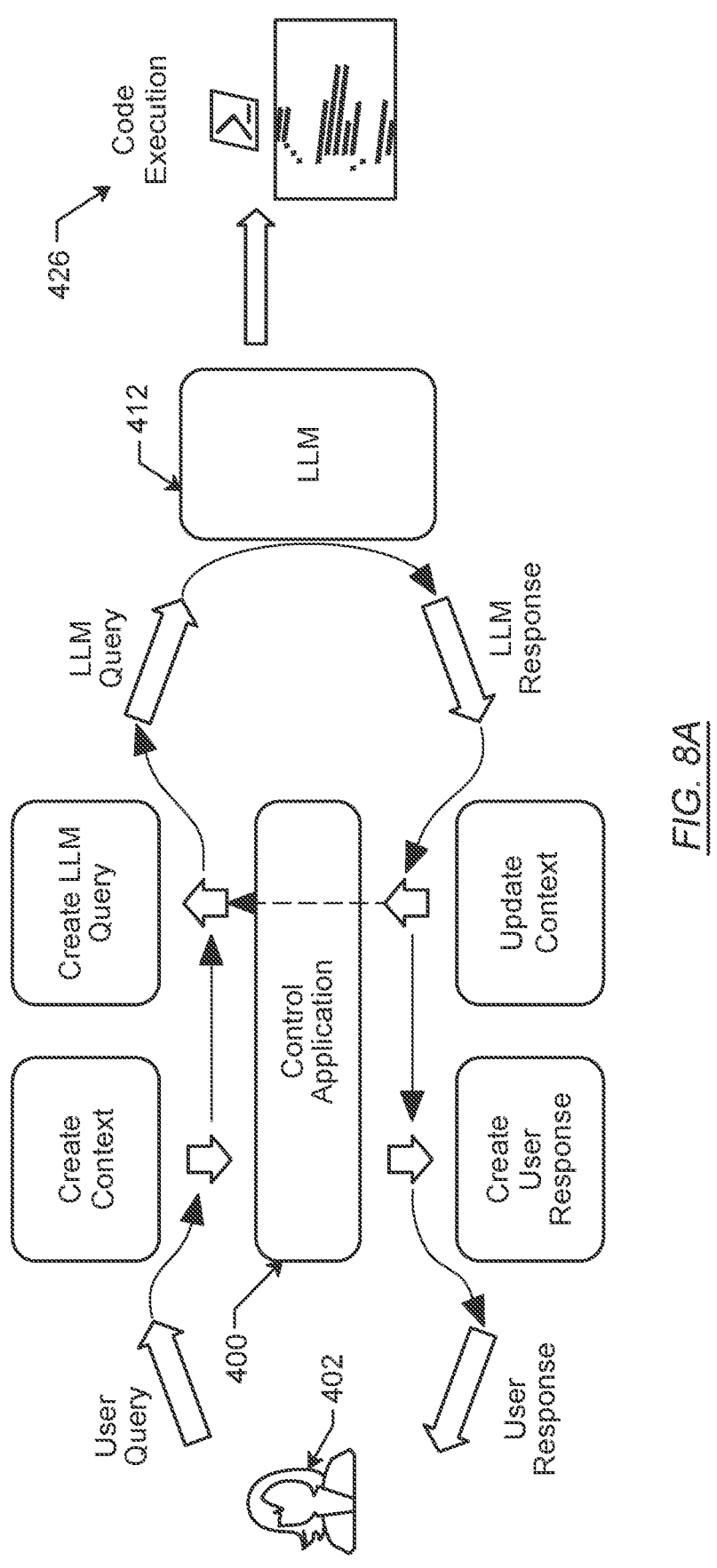
Figure 8B:
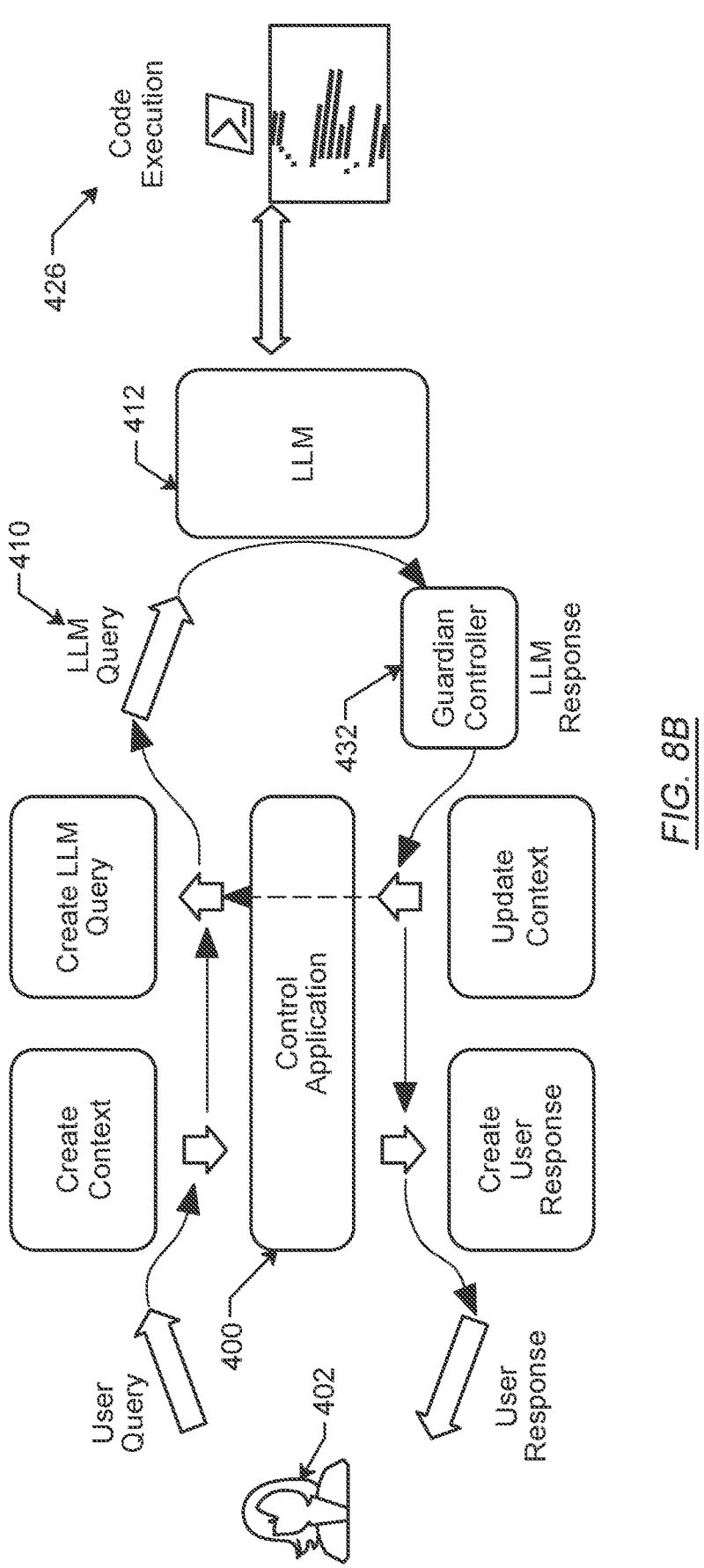

The step may be to provide or deny access to executable code. In this case, the executable code is generated by or retrieved from the controlled application. An example is shown in FIG. 8A and FIG. 8B.

Figure 9A:
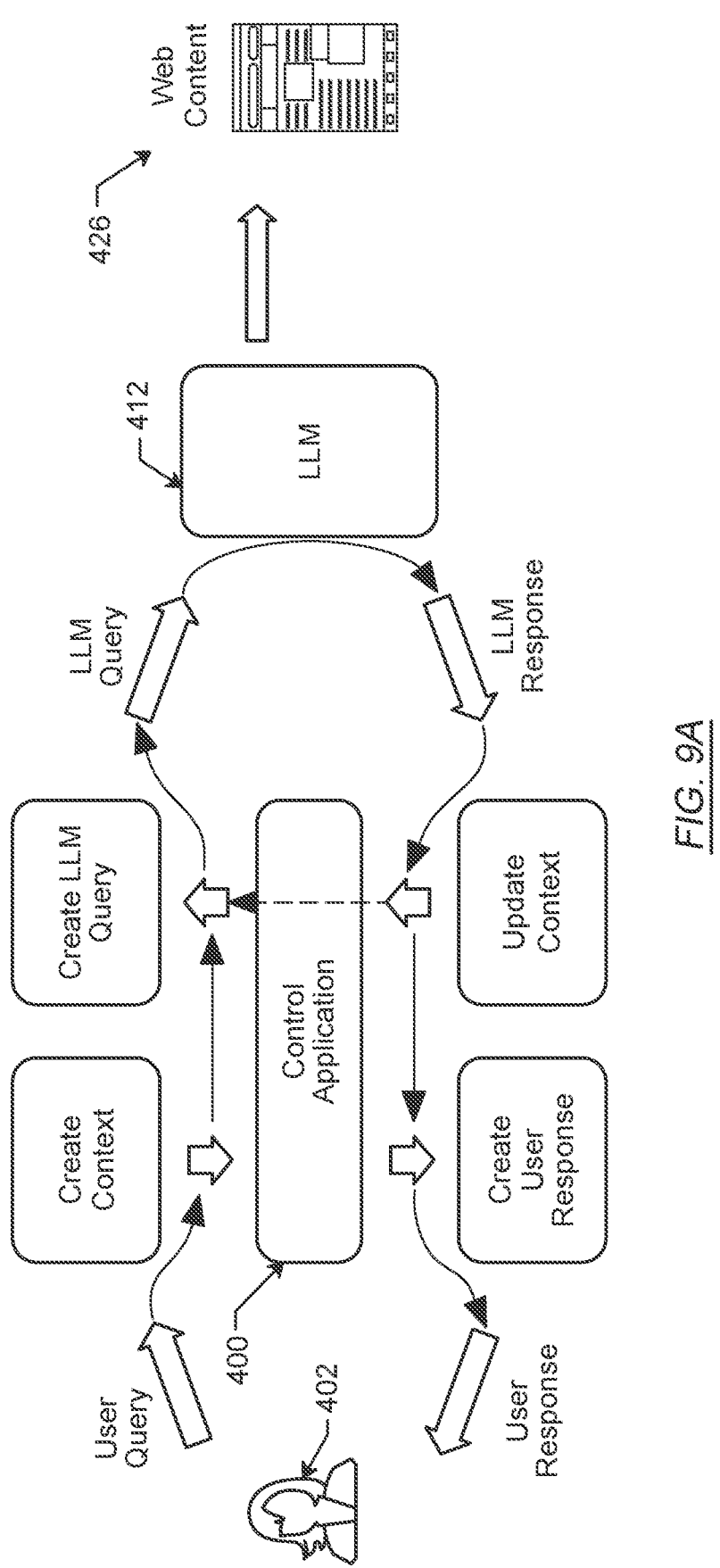
Figure 9B:
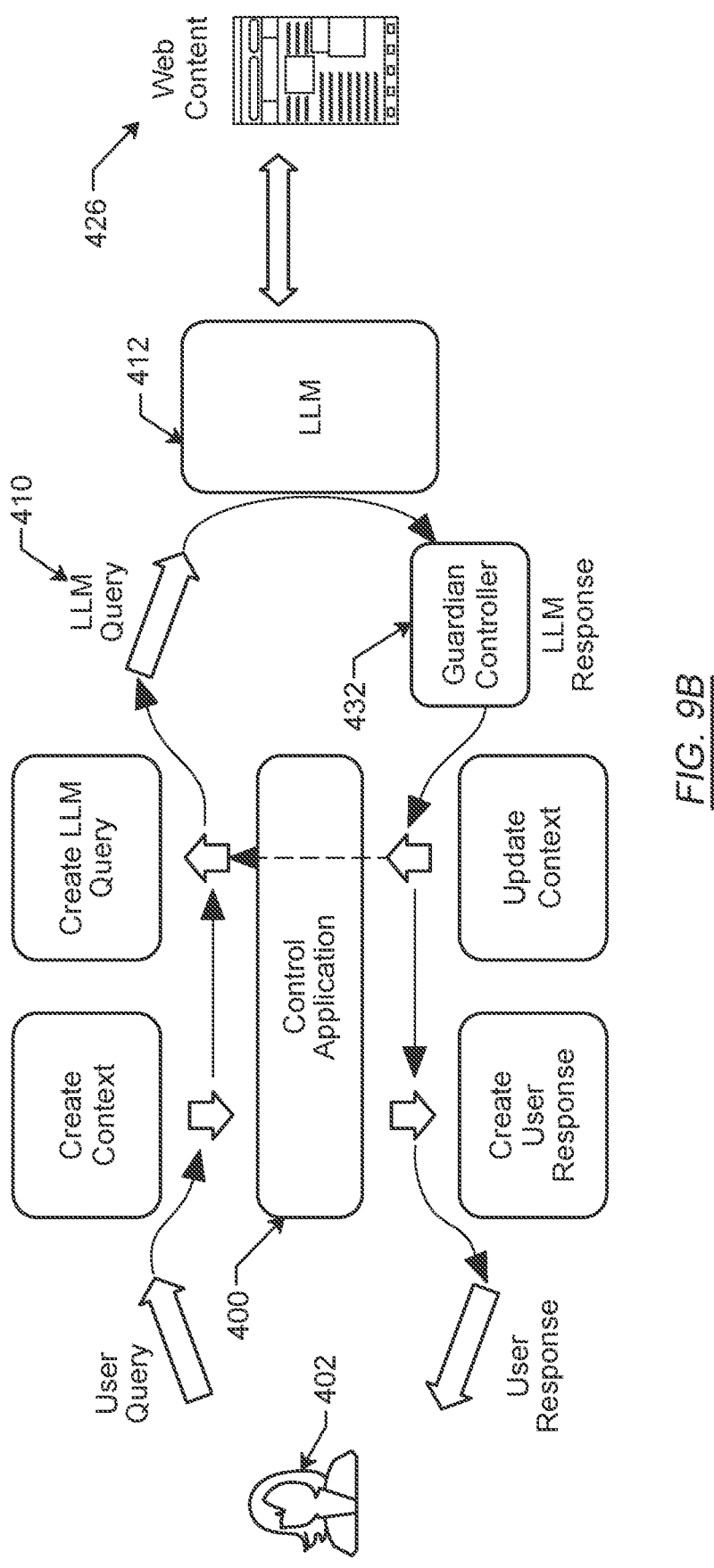

The step may be to grant or restrict access of the control application to network content. In this case, the network content is generated by or retrieved from the controlled application. An example is shown in FIG. 9A and FIG. 9B.

The step may be to enforce at least one of a whitelist and a blacklist on the first output of the large language model. The enforcement scheme also may be to enforce at least one of the whitelist or the blacklist.

Many other security schemes are possible. Thus, the examples of the security scheme described above do not necessarily limit the appended claims, unless explicitly provided otherwise.

The method of FIG. 2 may be varied. For example, the method of FIG. 2 also may include coordinating, prior to receiving the first output and by the control application, a first input and the first output of the large language model.

The method of FIG. 2 also may include other steps. For example, the method of FIG. 2 may include receiving, by the control application, a user request. Then, the method includes converting, by the control application, the user request into a first input of the large language model. Then, the method includes executing the large language model on the first input, together with the prompt injection cyberattack, to generate the first output of the large language model.

In another variation, the method of FIG. 2 may include generating a second output of a controlled application by executing the controlled application using the first output of the large language model. Then, the method may include returning, after enforcing the security scheme, the second output of the controlled application to the control application. Returning may include transmitting the first output of the large language model to the control application via the guardian controller.

Still other variations of the method of FIG. 2 are possible. More or fewer steps may be provided, or the steps may be varied. The method of FIG. 2 may be expanded to accommodate additional ones of any of large language models, control applications, and controlled applications.

Attention is now turned to FIG. 3. FIG. 3 is a method of training the machine learning model used in the guardian controller. The method of FIG. 3 may be implemented using the system shown in FIG. 1A and FIG. 1B, and in particular may be implemented using the system shown in FIG. 1B.

Step 300 includes generating, by a control application, queries to a large language model, where at least some of the queries include known prompt injection cyberattacks. The queries may be generated by a data scientist manipulating the control application, or some other input scheme, for generating the queries to the large language model. In an embodiment, the generation of the queries may be performed by retrieving historical queries submitted to the large language model, some of which were known to include the prompt injection cyberattacks. The generated queries may be considered training data, in reference to FIG. 1B.

Step 302 includes generating first outputs of the large language model by executing the large language model on at least a subset of the queries. The large language model takes, as input, at least some of the queries and generates, as output, text. The outputs may be normal outputs (i.e., not affected by a prompt injection cyberattack) or may be poisoned outputs (i.e., influenced in some way by the prompt injection cyberattack).

Step 304 includes training, iteratively, the machine learning model using the first outputs and a second subset of the queries until convergence to generate a trained machine learning model which, when executed, is trained to detect prompt injection cyberattacks in monitored outputs of the large language model. Training may be performed according to the techniques described with respect to FIG. 1B.

For example, each iteration of the machine learning model being trained may generate probabilities that the outputs of the large language model are poisoned outputs. The probabilities are compared to the known properties (poisoned or normal) of the outputs of the large language model. The machine learning model is adjusted and then the process repeated. The iterative process continues until convergence, whereupon the machine learning model is deemed trained.

In this manner, the machine learning model is trained to generate probabilities that the monitored outputs of the large language model satisfy a threshold. The probabilities represent likelihoods that the monitored outputs of the large language model are poisoned by at least one of the prompt injection cyberattacks.

The method of FIG. 3 may be varied. For example, the method of FIG. 3 also may include adding the trained machine learning model to a guardian application that monitors the monitored outputs of the large language model prior to the guardian application passing of the monitored outputs to a control application. In addition, the machine learning model may be retrained (i.e. updated) according to the method of FIG. 3, and then the retrained machine learning model may replace a previous version of the machine learning model used in the guardian application.

In another example, the method of FIG. 3 also may include receiving, by the trained machine learning model, a new output of the large language model. In this case, the method may include determining, by the trained machine learning model, that the new output satisfies a threshold. Then the method may include enforcing a security scheme on the new output of the large language model prior to transmitting the new output to the control application. Thus, the method of FIG. 3 may include both the training phase of machine learning as well as the inference phase of machine learning.

The method of FIG. 3 also may include building, prior to receiving the new output, a baseline profile for communication between the large language model and the control application. In this case, enforcing the security scheme may include enforcing the baseline profile on the new output of the large language model.

The baseline profile may be enforced in a manner similar to the manner in which the security scheme is enforced. Specifically, the baseline profile may be compared to the current profile of how the control application is behaving. If the current profile deviates from the baseline profile in some pre-determined manner, then the security scheme may be enforced. In other words, it is not necessary that the probabilities be generated by the machine learning model of the guardian application. Instead, the baseline profile may be used to monitor the controlled application, possibly in conjunction with the generation of probabilities by the machine learning model of the guardian application.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

Attention is now turned to specific examples of the system shown in FIG. 1A and FIG. 1B and the methods shown in FIG. 2 and FIG. 3. The examples are shown in FIG. 4A through FIG. 9B. The following example is for explanatory purposes only and not intended to limit the scope of the one or more embodiments. Common reference numerals in FIG. 4A through FIG. 9B refer to common objects and may have common definitions.

Figure 4A:
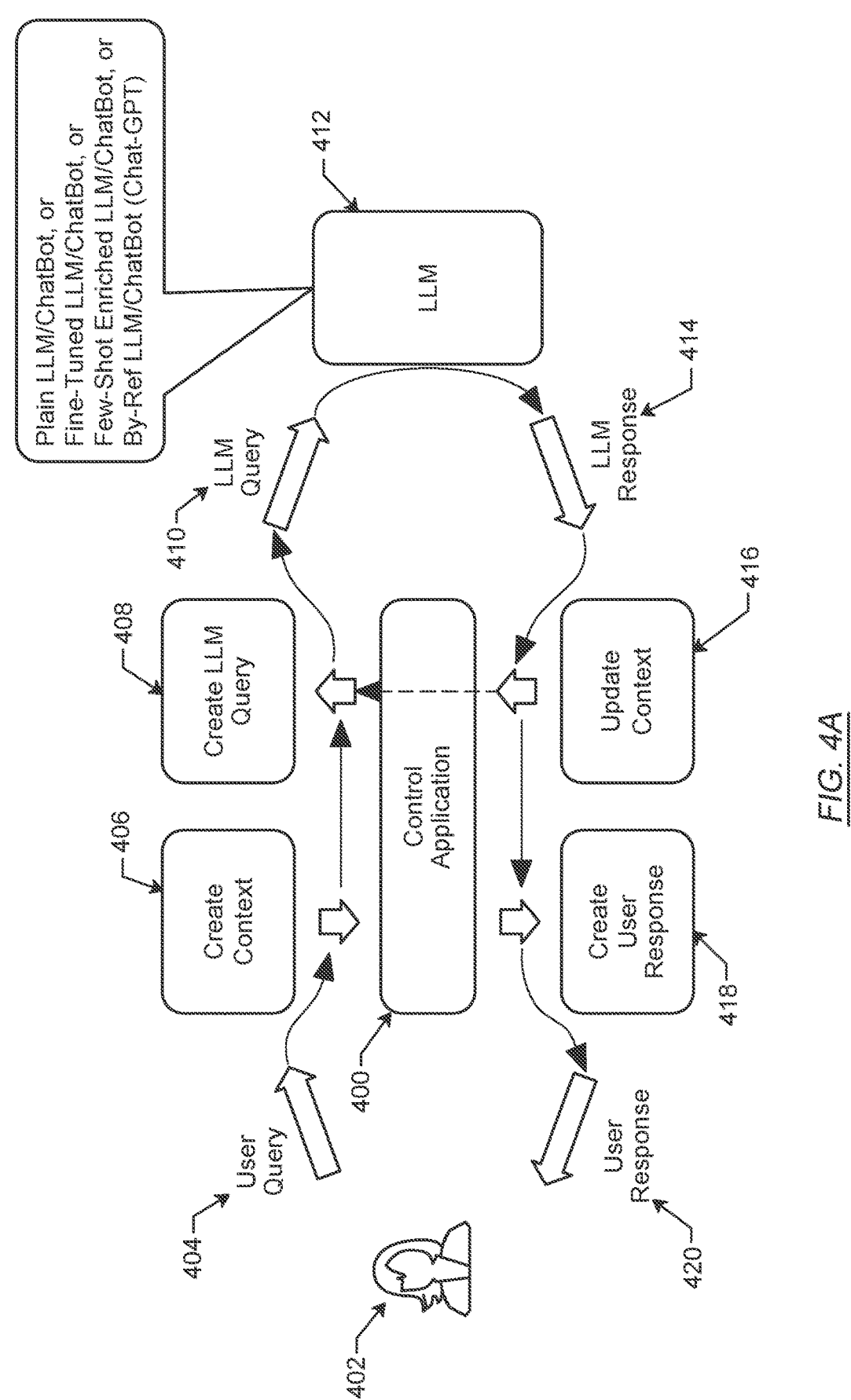
FIG. 4A, FIG. 4B, FIG. 5A, FIG. 5B, FIG. 6A, FIG. 6B, FIG. 7A, FIG. 7B, FIG. 8A, FIG. 8B, FIG. 9A, and FIG. 9B show examples, in accordance with one or more embodiments.

FIG. 4A shows the normal use of a control application (400) used by a user (402). The control application (400) may be the control application (132) of FIG. 1A. The user (402) generates a user query (404), which creates a context (406) for the control application (400) to use. The context may be, for example, a sample text that the user desires to have summarized, with the summary to be generated by a large language model (412). The control application (400) may execute a create step (408) to create a large language model query (410) for the user (402). The large language model query (410) may have specific formatting or information requirements, which the control application (400) may ensure are satisfied. Thus, the control application (400) may help users unfamiliar with use of the large language model (412) to use the large language model (412).

The control application (400) then submits the large language model query (410) to the large language model (412). The large language model (412) is executed, and then generates a large language model output (414). The large language model output (414) may be, for example, summarized text.

The large language model output (414) is used to update the context to generate an updated context (416). The updated context (416) may be, for example, the summarized text generated by the large language model (412). However, the updated context (416) also may include additional information, such as pictures, formatting for the pictures and the summarized text, and possibly other information or files.

Next, the control application (400) may generate, at a create user response step (418), a user response (420). The user response (420) may be the ultimate output of interest to the user (402). For example, the create user response step (418) may be an email draft populated by the email addressed selected recipients and containing a formatted, multi-media message having the text content summarized by the large language model (412). The user (402) then may use the user response (420) (e.g., to send the email).

Figure 4B:
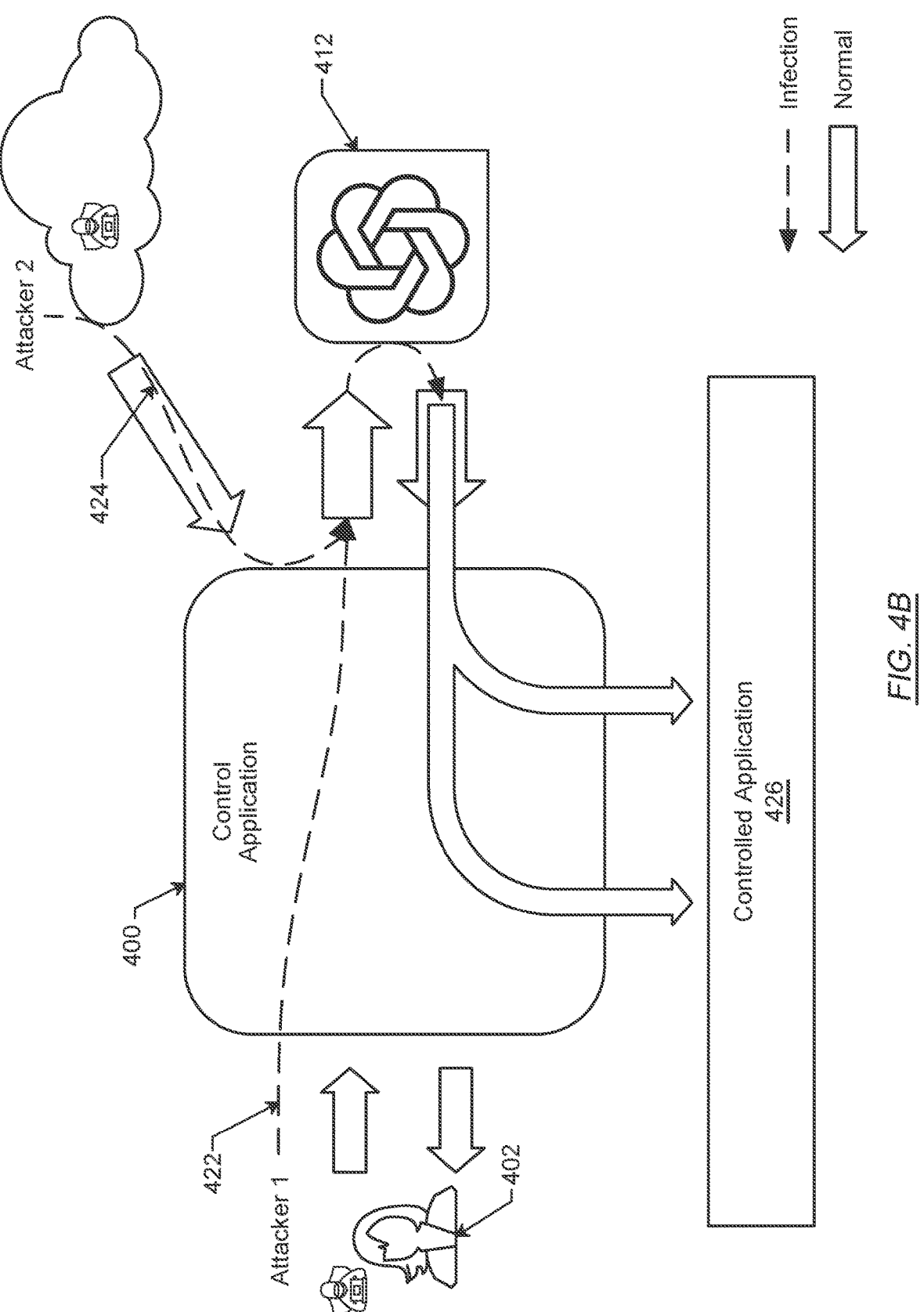

FIG. 4B shows the attack paths of one or more malicious users, such as attack path 1 (422) and attack path 2 (424). Note that while two different malicious users are shown, it is possible that a single malicious user is using both the attack path 1 (422) and the attack path 2 (424).

The attack path 1 (422) is to access the control application (400), possibly through the user device of the user (402). Thus, for example, malicious code could submit a command via a web browser of the user to the control application (400). The malicious code generates a prompt injection cyberattack, which is passed to the large language model (412). In turn, the large language model (412) may pass its output to one or both of the control application (400) or a controlled application (426). The controlled application (426) may be, for example, an email generation program that generates the exemplary email described above with respect to FIG. 4A.

Because the output of the large language model (412) is influenced by the prompt injection cyberattack along the attack path 1 (422), the poisoned output of the large language model (412) influences the control application (400), the controlled application (426), or both. As a result, the user response (420) ultimately returned to the user (402) is poisoned by the prompt injection cyberattack.

The attack path 2 (424) is to access the large language model (412) directly. In this case, the control application (400) may attempt provide a legitimate input to the large language model (412). However, the malicious code of the malicious user device may intercept the legitimate input and replace the legitimate input with the prompt injection cyberattack. Alternatively, the malicious code of the malicious user device may modify the legitimate input with the prompt injection cyberattack. In either case, the input to the large language model (412) is modified, and as a result the output of the large language model (412) is poisoned by the prompt injection cyberattack.

Figure 5A:
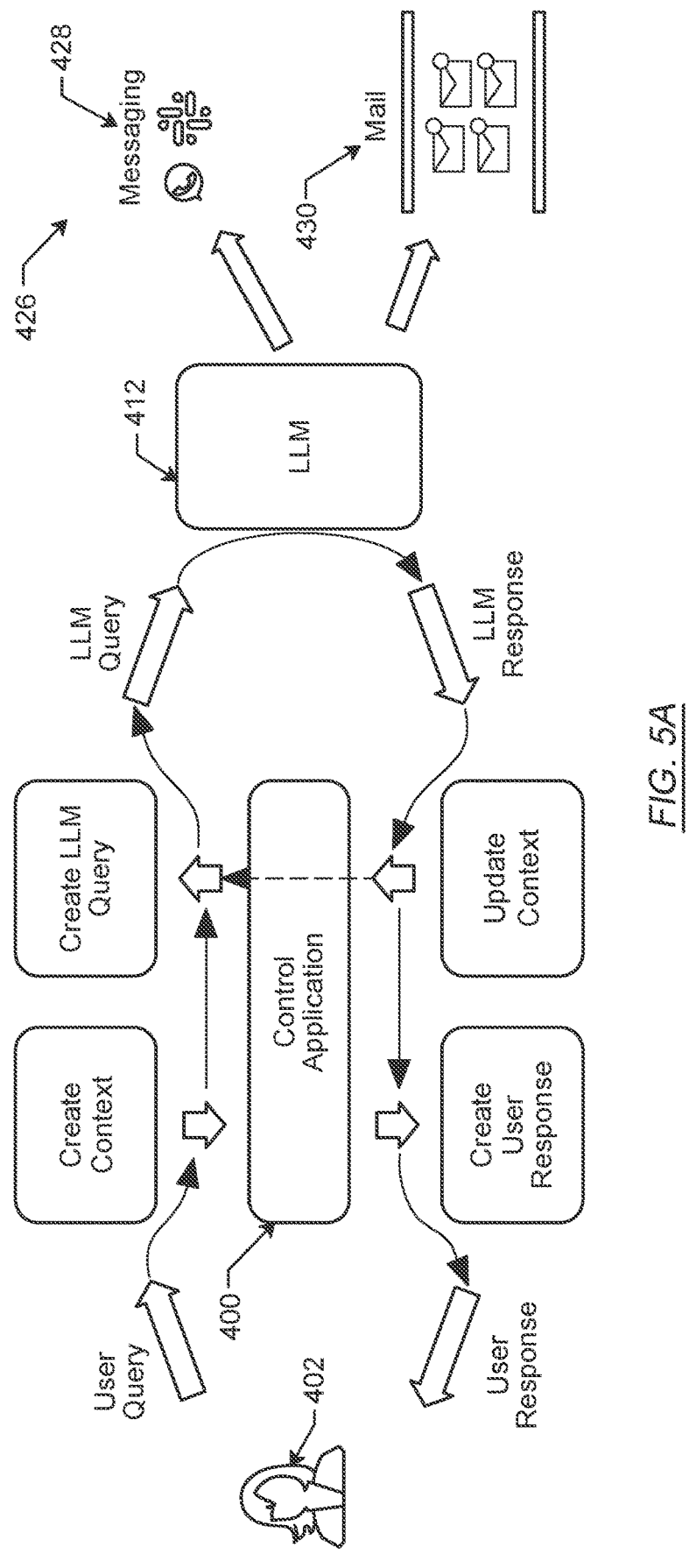
Figure 5B:
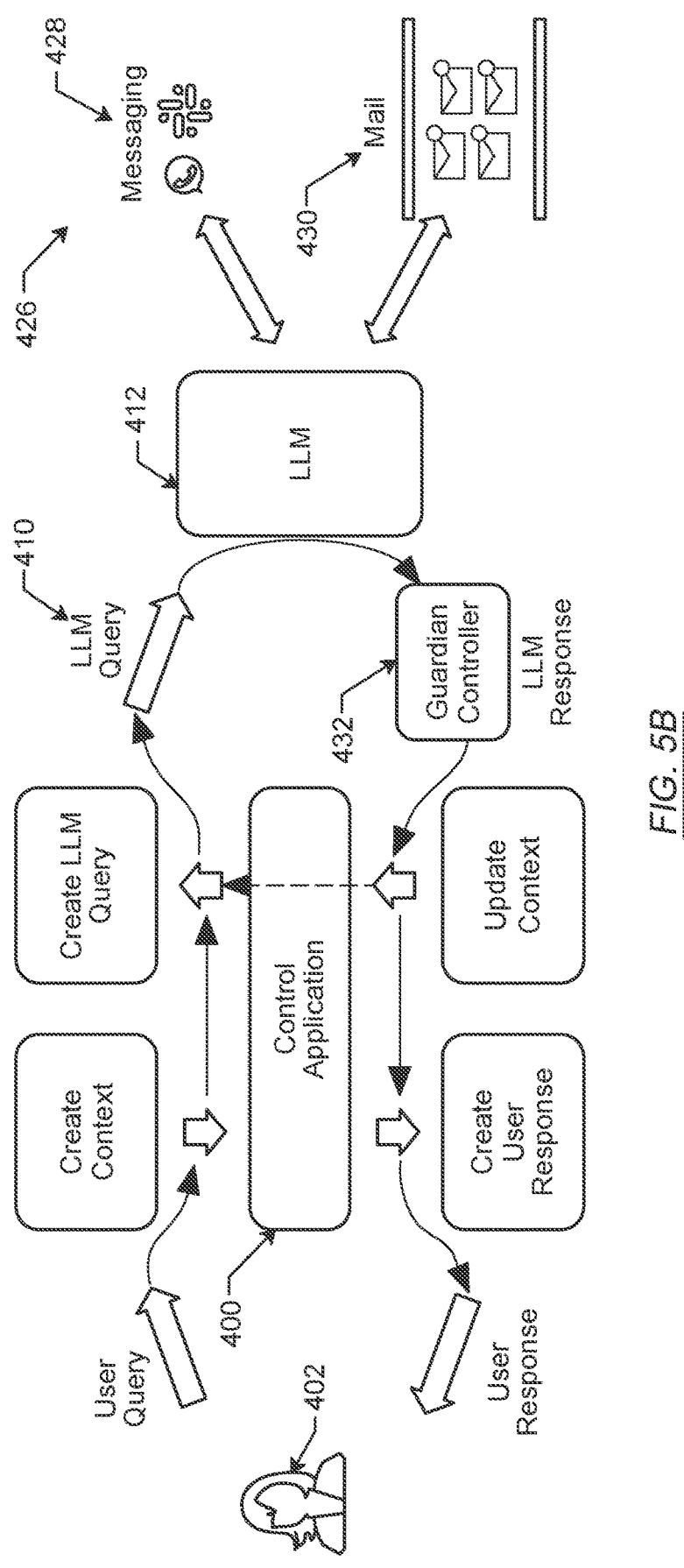

Attention is turned to FIG. 5A and FIG. 5B, which shows a specific type of prompt injection cyberattack, and an example of a guardian controller (432). The guardian controller (432) may be the guardian controller (138) of FIG. 1A and may operate as described with respect to FIG. 2. The prompt injection cyberattack in the example of FIG. 5A and FIG. 5B may be to poison the first output of the large language model (412) in order to generate spam (unwanted messages or emails, possibly to many users) or phishing emails (message having links to malicious code or websites).

In the example of FIG. 5A, the control application (400) is designed to assist the user (402) with generating messages having a desired message content by coordinating the operation of the large language model (412) and the controlled application (426). The controlled application (426) in this example is a messaging service (428) and an email program (430). In this example, the control application (400) is designed to generate messages and emails having the desired message content by using the large language model (412) to assist in generation of the message content, and then to actually transmit the assist the user with via one or both of the messaging service (428) and the email program (430).

FIG. 5B shows the operation of the guardian controller (432). In this example, the large language model (412) generates a first output by executing on a first input provided by the large language model query (410). Either the control application (400) or the large language model (412) may then interact with the controlled application (426) to generate the desired message content. The first output of the large language model (412) is provided to the guardian controller (432) as input.

The guardian controller (432) determines a probability that the first output by the large language model (412) is poisoned by a prompt injection cyberattack. If the probability fails to satisfy a threshold, then the normal operational procedure of the control application (400) continues. The control application (400) generates the messages and the emails with the message content, and then transmit those messages and emails via the messaging service (428) and the email program (430).

However, if the probability satisfies the threshold, then the guardian controller (432) implements a security scheme on the control application (400). The security scheme may be to require user authentication by the user (402) to transmit the messages and emails, may be to block transmission of the messages and emails altogether, may be to limit the number of recipients to a whitelist of recipients, or some other security action. In this manner, the prompt injection cyberattack may be mitigated or defeated.

Attention is turned to FIG. 6A and FIG. 6B, which shows a specific type of prompt injection cyberattack, and an example of guardian controller (432). The guardian controller (432) may be the guardian controller (138) of FIG. 1A and may operate as described with respect to FIG. 2. The prompt injection cyberattack in the example of FIG. 6A and FIG. 6B may poison the first output of the large language model (412) and thereby change the final content sent to the user. For example, the purpose of the prompt injection cyberattack may be to alter the summarization of multiple URLs on the Internet so that the summarization contains false, misleading, or obnoxious information. The poisoned summarization could also include viruses or other malicious software.

In the example of FIG. 6A, the control application (400) is designed to assist the user with accessing the Internet in a controlled manner. Alternatively, the control application (400) may be programmed to collect and summarize information from a selected set of websites published on the Internet, and then return that summarized information to the control application (400). Thus, the Internet, or the websites, in this example is the controlled application (426). Note that the term "controlled application" still applies to the Internet, even though the Internet is not actually controlled by the control application (400). The term "controlled application" still is used in order to maintain a consistent use of terms.

In the example of FIG. 6B, the guardian controller (432) again monitors the first output of the large language model (412). The large language model (412) may summarize the information from the controlled application (426) (the Internet in this example) or may perform some other natural language processing task on information from the controlled application (426).

The guardian controller (432) determines a probability that the first output by the large language model (412) is poisoned by a prompt injection cyberattack. If the probability fails to satisfy a threshold, then the normal operational procedure of the control application (400) continues. The control application (400) receives the summarized information, and then transmits the summarized information to the user (402).

However, if the probability satisfies the threshold, then the guardian controller (432) implements a security scheme on the control application (400). The security scheme may be to alert the user (402) that the content of the summarization may be manipulated by a prompt injection cyberattack. The security scheme may be to block transmission of the summarized information altogether, may be to cut off communication between the control application (400) and the URLs on the Internet from which the information was retrieved. In this manner, the prompt injection cyberattack may be mitigated or defeated.

Attention is turned to FIG. 7A and FIG. 7B, which shows a specific type of prompt injection cyberattack, and an example of guardian controller (432). The guardian controller (432) may be the guardian controller (138) of FIG. 1A and may operate as described with respect to FIG. 2. The prompt injection cyberattack in the example of FIG. 7A and FIG. 7B may be to modify the information returned from a database, which is the controlled application (426) in this example.

In the example of FIG. 7A, the control application (400) is designed to assist the user with retrieving information from the controlled application (426). The user (402) submits a user query to summarize information pertaining to a vast amount of data contained with the controlled application (426). The large language model (412) accesses the controlled application (426), gathers the information as the first input, and then executes on the retrieved (or received) information. The first output of the large language model (412) is the summary that is returned to the user (402) via the control application (400).

In FIG. 7B, the guardian controller (432) determines a probability that the first output by the large language model (412) is poisoned by a prompt injection cyberattack. If the probability fails to satisfy a threshold, then the normal operational procedure of the control application (400) continues. The control application (400) returns the information from the controlled application (426), possibly as a summary of the information. The returned information is then returned to the control application (400) and then to the user (402).

However, if the probability satisfies the threshold, then the guardian controller (432) implements a security scheme on the control application (400). The security scheme may be to notify the user (402) that the summarized information may be poisoned by a prompt injection cyberattack, may be to block transmission of the summarized information altogether, or some other security action. In this manner, the prompt injection cyberattack may be mitigated or defeated.

Attention is turned to FIG. 8A and FIG. 8B, which shows a specific type of prompt injection cyberattack, and an example of guardian controller (432). The guardian controller (432) may be the guardian controller (138) of FIG. 1A and may operate as described with respect to FIG. 2. The prompt injection cyberattack in the example of FIG. 8A and FIG. 8B may be to generate or retrieve executable code. Thus, in this example the large language model (412) may generate the executable code or may retrieve some or a portion of remotely available executable code. Again, the executable code may be referred to as a "controlled application," whether or not the executable code is actually executed, in order to maintain a consistent reference. Note that the controlled application (426) may be a code generator, in which case the large language model (412) may summarize the generated code, take snippets of the generated code, or convert the generated code.

In the example of FIG. 8A, the control application (400) is designed to assist the user with generating, retrieving, or converting the executable code. As with the prior examples, the large language model (412) is involved in the process by performing the generating, retrieving, or converting of the executable code.

In FIG. 8B, the prompt injection cyberattack takes the form of an attempt to manipulate the operation of the large language model (412) with respect to the controlled application (426). For example, the prompt injection cyberattack may attempt to command the large language model (412) to modify the controlled application (426) for a malicious purpose. In a specific example, the prompt injection cyberattack may cause the large language model (412) to embed a virus in the controlled application (426) or generate some vulnerability in the controlled application (426) that the malicious user could later use to attack the control application (400) or the device of the user (402).

Thus, the guardian controller (432) monitors the output of the large language model (412). In normal operation, if the probability generated by the guardian controller (432) does not satisfy the threshold, then the output of the large language model (412) and/or the controlled application (426) is returned to the control application (400) for use by the user (402).

However, if the probability generated by the guardian controller (432) does satisfy the threshold, then the guardian controller (432) implements a security scheme. For example, the guardian controller (432) may prevent the controlled application (426) from being transferred to the control application (400) or to the control application (400). In another example, the user (402) may be alerted that the executable code may have been influenced by a prompt injection cyberattack. Other security actions could be taken.

Attention is turned to FIG. 9A and FIG. 9B, which shows a specific type of prompt injection cyberattack, and an example of guardian controller (432). The guardian controller (432) may be the guardian controller (138) of FIG. 1A and may operate as described with respect to FIG. 2. The prompt injection cyberattack in the example of FIG. 9A and FIG. 9B may be modify how the large language model (412) modifies web content. In this example, the web content is considered the "controlled application (426)," even if the content is not executable, for consistent term use. The example of FIG. 9A and FIG. 9B may be similar to the example of FIG. 6A and FIG. 6B.

In the example of FIG. 9A, the control application (400) is designed to assist the user with summarizing and digesting web content. In the example of FIG. 9B, the guardian controller (432) again monitors the first output of the large language model (412). The large language model (412) may summarize the information from the controlled application (426) (the web content in this example) or may perform some other natural language processing task on information from the controlled application (426).

As shown in FIG. 9B, the guardian controller (432) determines a probability that the first output by the large language model (412) is poisoned by a prompt injection cyberattack. If the probability fails to satisfy a threshold, then the normal operational procedure of the control application (400) continues. The control application (400) receives the summarized web content, and then the summarized content is transmitted to the user (402).

However, if the probability satisfies the threshold, then the guardian controller (432) implements a security scheme on the control application (400). The security scheme may be to alert the user (402) that the content of the summarization may be manipulated by a prompt injection cyberattack. The security scheme may be to block transmission of the summarized information altogether, may be to cut off communication between the control application (400) and the web content. In this manner, the prompt injection cyberattack may be mitigated or defeated.

Figure 10A:
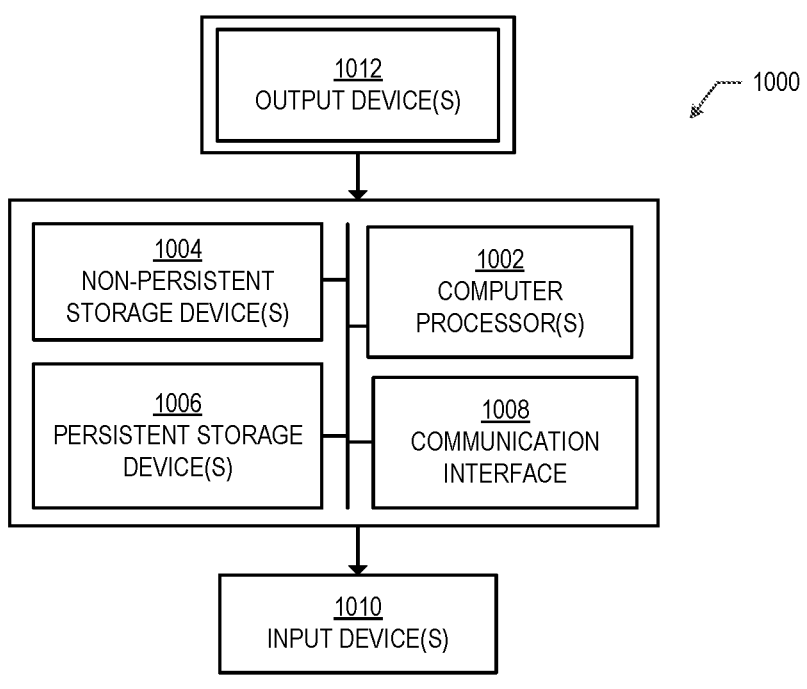
FIG. 10A and FIG. 10B show a computing system, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processor(s) (1002), non-persistent storage device(s) (1004), persistent storage device(s) (1006), a communication interface (1008) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1012). The inputs may include text input, audio input, video input, etc., which may be processed and transmitted by the computing system (1000) in accordance with the disclosure. The communication interface (1008) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1012) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1012) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 10B:
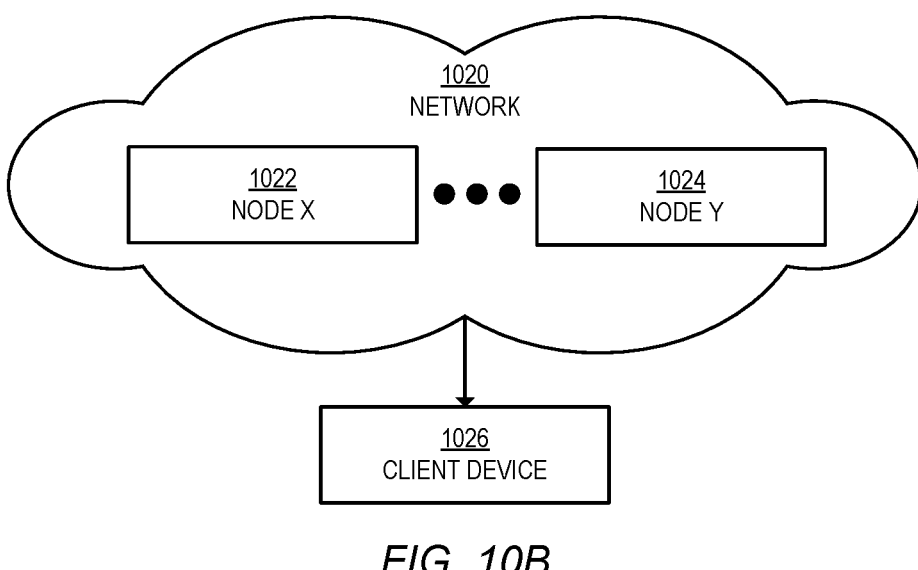

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving, at a large language model, a prompt injection cyberattack;

executing the large language model, wherein the large language model takes, as input, the prompt injection cyberattack and generates a first output;

receiving, by a guardian controller, the first output of the large language model, wherein the guardian controller comprises a classification machine learning model and a security application;

determining a probability that the first output of the large language model is poisoned by the prompt injection cyberattack, wherein determining the probability comprises:

providing the first output of the large language model as input to the classification machine learning model, and executing the classification machine learning model to generate the probability;

determining whether the probability satisfies a threshold;

enforcing, by the security application and responsive to the probability satisfying the threshold, a security scheme on use of the first output of the large language model by a control application, wherein enforcing the security scheme mitigates the prompt injection cyberattack;

generating a second output of a controlled application by executing the controlled application using the first output of the large language model; and returning, after enforcing the security scheme, the second output of the controlled application to the control application.

2. The method of claim 1, further comprising:

coordinating, prior to receiving the first output and by the control application, a first input and the first output of the large language model.

3. The method of claim 2, further comprising:

receiving, by the control application, a user request;

converting, by the control application, the user request into the first input of the large language model; and executing the large language model on the first input, together with the prompt injection cyberattack, to generate the first output of the large language model.

4. The method of claim 1, wherein returning comprises transmitting the first output of the large language model to the control application via the guardian controller.

5. The method of claim 1 wherein enforcing the security scheme comprises:

limiting the use of the first output of the large language model by the control application.

6. The method of claim 5, wherein limiting comprises at least one of:

preventing the control application from receiving the first output of the large language model;

modifying the first output of the classification machine learning model to comply with an enforcement profile;

forcing the control application to use a hard-coded list of actions or recipients; and requiring user authentication to execute the control application.

7. The method of claim 1, wherein enforcing comprises a step related to executing, by the guardian controller, a computer executed action performed at least in part by the controlled application, wherein the step is selected from the group consisting of:

permitting transmission of an email, or blocking transmission of the email, by the guardian controller, wherein the controlled application comprises an email generation program and wherein the computer executed action comprises generating the email;

granting or denying the control application access to a network, wherein the network comprises the controlled application;

granting or denying the control application access to a database, wherein the database comprises the controlled application;

providing or denying access to executable code, wherein the executable code is generated by or retrieved from the controlled application;

granting or restricting access of the control application to network content, wherein the network content is generated by or retrieved from the controlled application; and enforcing at least one of a whitelist and a blacklist on the first output of the large language model.

8. A system comprising:

a processor;

a data repository in communication with the processor;

a large language model which, when executed by the processor, generates a first output from a first input comprising at least a prompt injection cyberattack;

a control application which, when executed by the processor, is programmed to coordinate the first input and the first output of the large language model;

a controlled application which, when executed by the processor, is programmed to receive, as a second input, the first output from the large language model and to generate a second output using the first output from the large language model; and a guardian controller comprising:

a classification machine learning model which, when executed by the processor, is programmed to determine a probability that the first input comprises the prompt injection cyberattack, and a security application which, when executed by the processor, enforces a security scheme, wherein, when executed by the processor, the guardian controller is programmed to:

monitor the first output of the large language model;

determine the probability that the first output of the large language model is poisoned by the prompt injection cyberattack by providing the first output of the large language model to the classification machine learning model, and executing the classification machine learning model to generate the probability;

determine whether the probability satisfies a threshold;

enforce, responsive to the probability satisfying the threshold, the security scheme on use of the first output of the large language model by the control application, wherein enforcing the security scheme mitigates the prompt injection cyberattack;

generate a third output of the controlled application by executing the controlled application using the first output of the large language model; and return, after enforcing the security scheme, a third output of the controlled application to the control application.

9. The system of claim 8, further comprising:

a training controller which, when executed by the processor, is configured to train the classification machine learning model.

10. The system of claim 8, wherein the control application is programmed, when executed by the processor, to create the first input of the large language model based on a user query submitted by a user.

11. The system of claim 8, wherein a second third output of the controlled application is transmitted to at least one of the large language model and the guardian controller.

12. The system of claim 8, wherein the controlled application comprises at least one of:

an email application executable by the processor;

a connection to an external network;

a second data repository readable by the processor;

a code generation application executable by the processor; and a network content regulation application executable by the processor.

13. A method of training a classification machine learning model comprising:

generating, by a control application, a plurality of queries to a large language model, wherein at least some of the plurality of queries comprise known prompt injection cyberattacks;

generating a plurality of first outputs of the large language model by executing the large language model on at least a subset of the plurality of queries;

training, iteratively, the classification machine learning model using the plurality of first outputs and a second subset of the plurality of queries until convergence to generate a trained classification machine learning model which, when executed, is trained to detect unknown prompt injection cyberattacks in a plurality of monitored outputs of the large language model;

receiving, by the trained classification machine learning model, a new output of the large language model;

determining, by the trained classification machine learning model, that the new output satisfies a threshold; and enforcing a security scheme on the new output of the large language model prior to transmitting the new output to the control application.

14. The method of claim 13, wherein the classification machine learning model is trained to generate probabilities that the plurality of monitored outputs of the large language model satisfy a second threshold, wherein the probabilities represent likelihoods that the plurality of monitored outputs of the large language model are poisoned by at least one of the prompt injection cyberattacks.

15. The method of claim 13, further comprising:

adding the trained classification machine learning model to a guardian application that monitors the plurality of monitored outputs of the large language model prior to the guardian application passing of the plurality of monitored outputs to the control application.

16. The method of claim 13, further comprising:

building, prior to receiving the new output, a baseline profile for communication between the large language model and the control application, and wherein enforcing the security scheme comprises enforcing the baseline profile on the new output of the large language model.

* * * * *